United States Patent [19]

Sinclair

[11] Patent Number: 4,499,421

[45] Date of Patent: Feb. 12, 1985

[54] DIGITAL INDUCTION LOGGING SYSTEM INCLUDING MEANS FOR GENERATING A PLURALITY OF TRANSMITTER FREQUENCIES

[75] Inventor: Paul L. Sinclair, Houston, Tex.

[73] Assignee: Schlumberger Technology Corporation, Houston, Tex.

[21] Appl. No.: 271,275

[22] Filed: Jun. 8, 1981

[51] Int. Cl.³ .................. G01V 3/28; G01V 3/34; H03K 13/02

[52] U.S. Cl. .................. 324/339; 324/232; 340/347 DA; 340/857; 364/422

[58] Field of Search .............. 324/323, 329, 338–343, 324/346, 232, 233; 364/422; 340/857–861, 347 DA; 375/59

[56] References Cited

U.S. PATENT DOCUMENTS

| | | | |
|---|---|---|---|
| 2,220,070 | 11/1940 | Aiken | 175/182 |
| 2,790,138 | 4/1957 | Poupon | 324/339 |
| 3,056,917 | 10/1962 | Tanguy | 324/1 |
| 3,119,061 | 1/1964 | Tanguy | 324/6 |
| 3,147,429 | 9/1964 | Moran | 324/6 |
| 3,150,314 | 9/1964 | Tanguy | 324/6 |
| 3,179,879 | 4/1965 | Tanguy | 324/6 |
| 3,259,837 | 7/1966 | Oshry | 324/339 |
| 3,340,464 | 9/1967 | Gouilloud | 324/6 |
| 3,496,455 | 2/1970 | Gouilloud | 324/6 |
| 3,706,025 | 12/1972 | Regat | 324/6 |
| 3,835,371 | 9/1974 | Mirdadian et al. | 324/329 |
| 3,965,413 | 6/1976 | Yungul | 324/346 |
| 4,059,795 | 11/1977 | Mordwinken | 324/233 |
| 4,207,520 | 6/1980 | Flora et al. | 324/233 |
| 4,303,885 | 12/1981 | Davis et al. | 324/232 X |
| 4,322,683 | 3/1982 | Vieira et al. | 324/233 X |
| 4,424,486 | 1/1984 | Denton et al. | 324/233 X |

Primary Examiner—Gerard R. Strecker

[57] ABSTRACT

A digital induction resistivity logging system is disclosed for digitally measuring phase components in a receiver signal generated in response to eddy currents flowing in the earth's sub-surface formations. The induction logging system includes a central processing unit (CPU) located at the surface for receiving digital signals from a digital induction logging tool located downhole, and for analyzing the received data. The CPU supplies command and control signals to the induction logging tool to specify operating modes and parameters for obtaining the digital signals. The system further includes a digital telemetry system associated with a wireline cable for transmitting and receiving data between the induction tool and the CPU. The digital induction tool includes a digital sinewave generator for generating a highly phase stable, low distortion transmitter signal whose frequency is selectable from at least two of transmitter frequencies. Selection of the transmitter frequency may be based on optimizing the measurement of a characteristic of the formations being encountered by the tool. Automatic phase compensation is included to dynamically compensate for both static and dynamic temperature dependent phase errors due to circuits of the tool involved in the component measurements. A floating point analog-to-digital convertor capable of responding to the wide dynamic range in the detected phase component signals is provided to convert the phase detector output into digital signals for use by the CPU.

1 Claim, 17 Drawing Figures

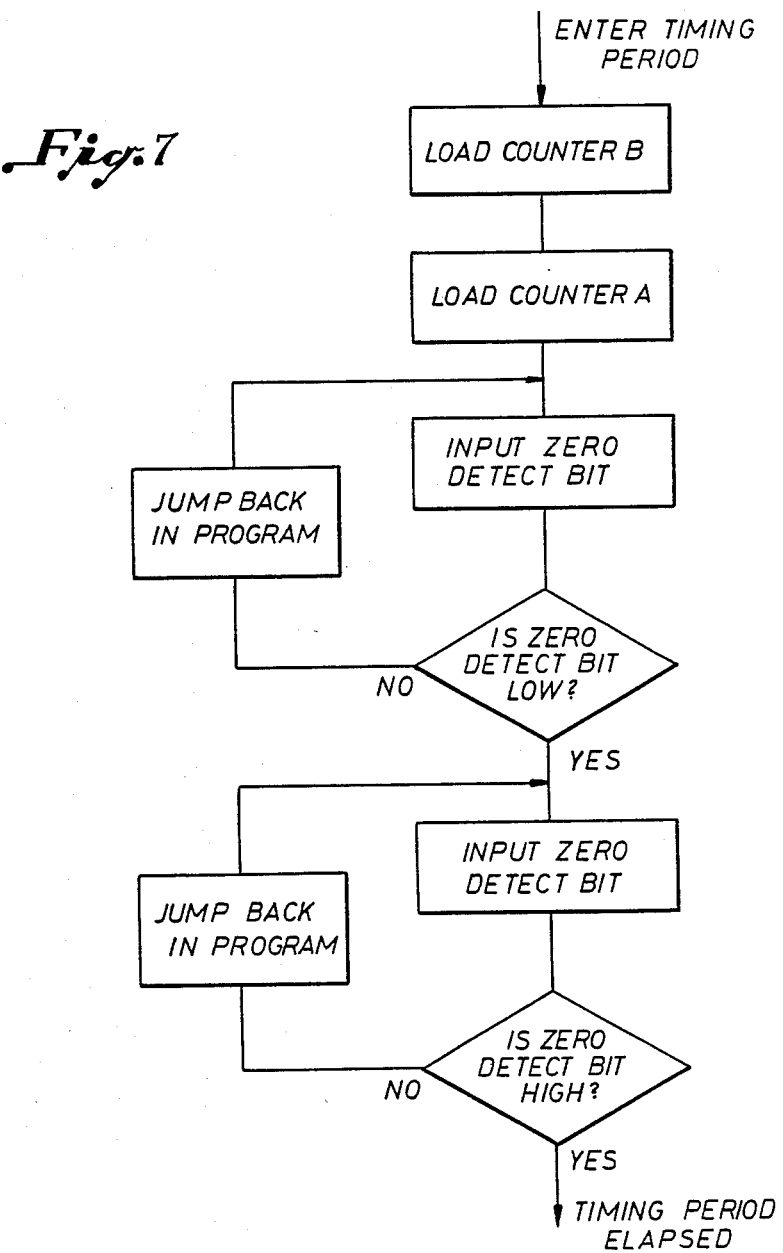

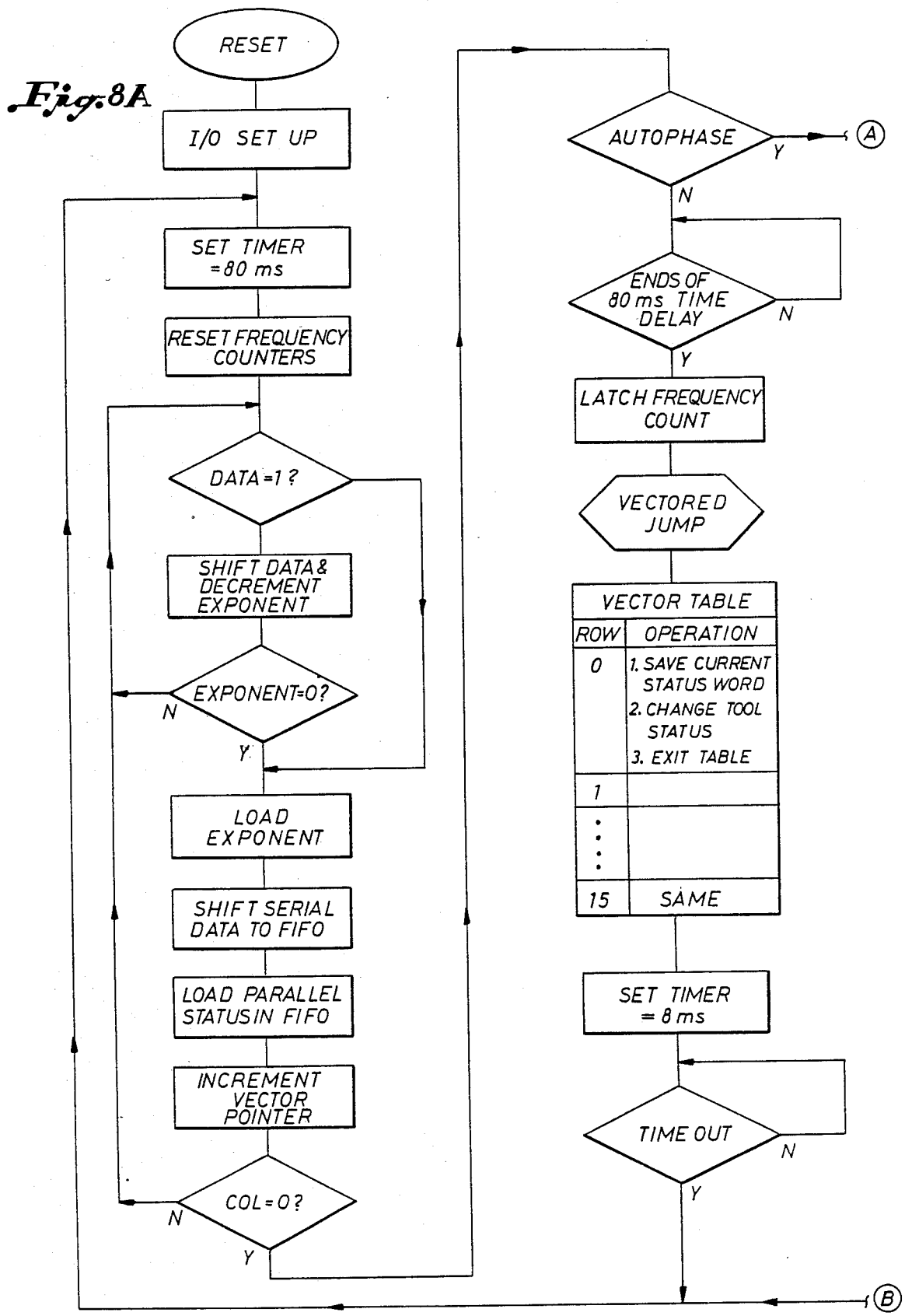

_Fig. 13_
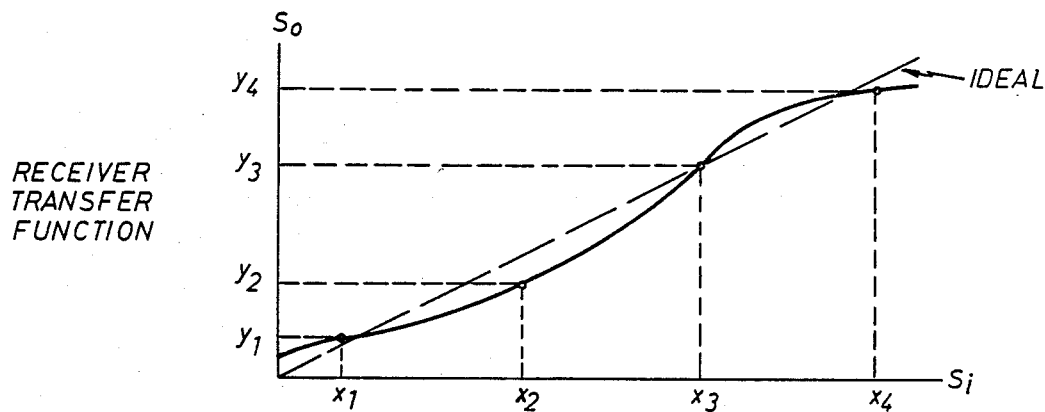
RECEIVER TRANSFER FUNCTION
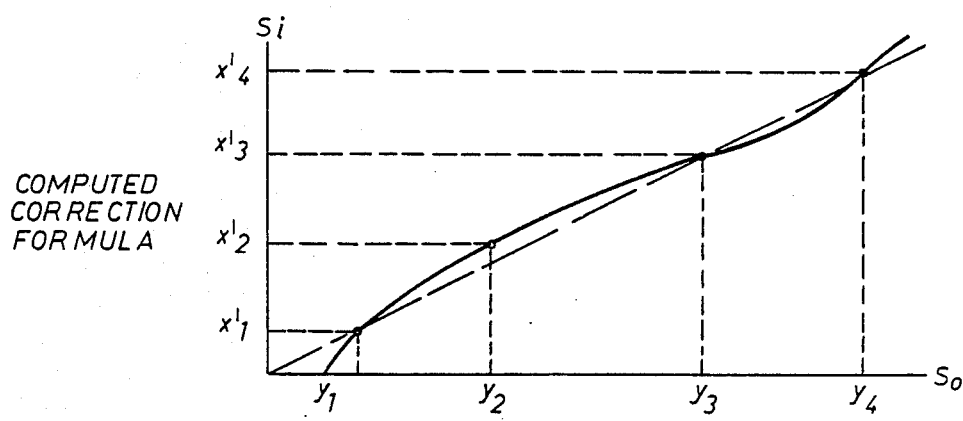
COMPUTED CORRECTION FORMULA
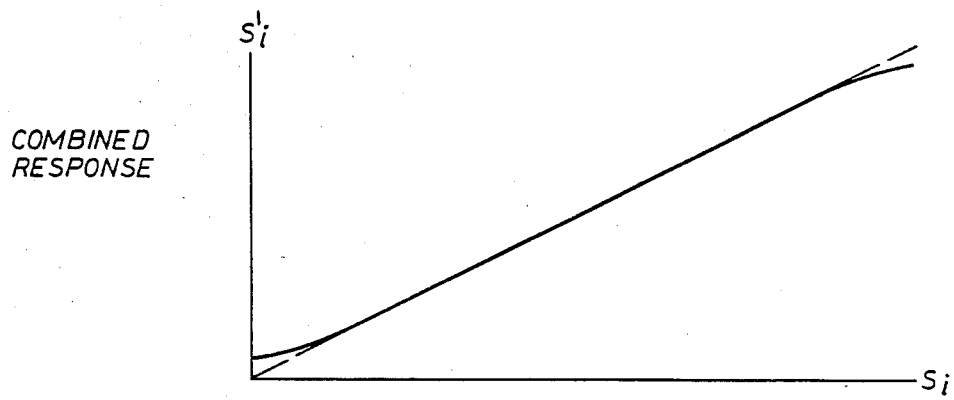
COMBINED RESPONSE

DIGITAL INDUCTION LOGGING SYSTEM INCLUDING MEANS FOR GENERATING A PLURALITY OF TRANSMITTER FREQUENCIES

TABLE OF CONTENTS

CROSS REFERENCE TO RELATED APPLICATIONS
BACKGROUND OF THE INVENTION
SUMMARY OF THE INVENTION
BRIEF DESCRIPTION OF THE DRAWINGS
DETAILED DESCRIPTION OF THE PREFERRED EMBODIMENT OF THE INVENTION
  The Digital Induction Logging System
  The Digital Induction Logging Tool
    The Controller
    The Waveform Generator
    The Phase Shift Error Compensation Circuits
      The Autophase Unit
    The Autocalibration Circuits
    The Floating Point Analog-to-Digital Convertor
  Summary of Operation
THE CLAIMS

CROSS REFERENCE TO RELATED APPLICATIONS

This application relates to the following applications which are filed concurrently herewith: U.S. patent application No. 271,278 and entitled "A Digital Induction Logging System Including Means for Measuring Phase Quadrature Components in a Phase Sensitive Detector;" U.S. patent application No. 271,279 and entitled "A Digital Induction Logging Tool Including a Floating-Point A/D;" U.S. patent application No. 271,280 and entitled "A Digital Induction Logging Tool Including Means for Compensating for Phase Shift Errors;" U.S. patent application No. 271,367 and entitled "Digital Induction Tool;" and U.S. patent application No. 271,277 and entitled "An Induction Logging System Including Autocalibration." Each of the related applications are assigned to the same Assignee as the present application.

BACKGROUND OF THE INVENTION

This invention relates to electrical induction logging systems for determining the nature and characteristics of the various sub-surface formations penetrated by a borehole drilled into the earth. More particularly, this invention relates to a digital induction logging system for obtaining digital samples of signals characteristic of the resistivity of the formations.

It is important to the oil and gas industry to know the nature and characteristics of the various sub-surface formations penetrated by a borehole since the mere drilling of a borehole usually does not provide sufficient information concerning the existence, depth location, quantity, etc., of oil and gas trapped in the formations. Various electrical techniques have been employed in the past to determine this information about the formations. One such technique commonly used is induction logging. Induction logging measures the resistivity (or its inverse, conductivity) of the formation by first inducing eddy currents to flow in the formations in response to an AC transmitter signal, and then measuring a phase component signal in a receiver signal generated by the presence of the eddy currents. Variations in the magnitude of the eddy currents in response to variations in formation conductivity are reflected as variations in the receiver signal. Thus, in general, the magnitude of a phase component of the receiver signal, that component in-phase with the transmitter signal, is indicative of the conductivity of the formation.

In theory, the electrical resistivity of the formation should be relatively high when the formation contains a high percentage of hydrocarbons because hydrocarbons are relatively poor conductors of electricity. Where hydrocarbons are not present in the formations and the formations contain salt water, the electrical resistivity of the formation should be relatively low. Formation water, which typically is salty, is a relatively good conductor of electricity. Induction resistivity logging tools thus obtain information about the formations which can be interpreted to indicate the presence or absence of these hydrocarbons.

U.S. Pat. Nos. 3,340,464, 3,147,429, 3,179,879 and 3,056,917 are illustrative of typical prior-art well logging tools which utilize the basic principles of induction logging. In each of the tools disclosed in these patents, a signal generator operates to produce an AC transmitter signal which is applied to a transmitter coil. The current in the transmitter coil induces a magnetic field in the formations. This magnetic field, in turn, causes eddy currents to flow in the formations. Because of the presence of these formation currents, a magnetic field is coupled into a receiver coil R thereby generating a receiver signal. (Logging tools having "a receiver coil" and "a transmitter coil" each comprised of several coils arranged in a predetermined fashion to obtain a desired response are commonly used.) The receiver signal is then amplified and applied to one or more phase sensitive detectors (PSDs). Each PSD detects a phase component signal having the same phase as a phase reference signal which is also applied to the detector. The phase reference signal has a predetermined phase relationship to the current in the transmitter coil(s). The output of the PSD(s) may be further processed downhole, or may be sent uphole to surface equipment for processing or display to an operating engineer.

Heretofore, prior-art induction resistivity logging tools have been primarily analog in design, with some digital circuits used to perform some functions, e.g., see the digital flip-flops of U.S. Pat. No. 3,340,464. Because of the analog nature of prior-art designs and for other reasons, these prior-art tools have limitations which prevent them from meeting a growing need for more precise, accurate and error free measurements of phase component signals in the receiver signal.

A quantitative determination of the conductivity of the formations is based in large part on the value obtained for the phase component signal that is inphase with the transmitter current in the transmitter coil. This component signal is referred to as the real or "R" phase component. Measurement of a phase component signal which has a phase orthogonal to (or in other words, in quadrature to) the transmitter current is sometimes obtained. This component signal is referred to as the "X" phase component signal.

Measurement of both the R and X phase component signals of the receiver signal is known. U.S. Pat. Nos. 3,147,429 and 3,179,879 both disclose induction logging tools which detect phase quadrature components ($V_r$ and $V_x'$) of the receiver signal from the receiver coil. The tools disclosed in these patents show the output from a receiver amplifier being applied to identical PSD circuits, one for detecting the R component signal and the other for detecting the X component signal. Appropriate phase shifting components are provided for generating the phase quadrature phase reference signals required by the PSDs in order to resolve the phase component signals.

The need for higher precision and accuracy in the resolution of these phase component signals is a natural consequence of the need to know more about formation characteristics that can be extracted from the signals representative of these characteristics. But, to obtain accurate measurements, the inaccuracies present in the measurements obtained by the prior-art tools must be eliminated. A principal source of inaccuracies in the measurement of the R and X component signals present in prior-art logging tools results from phase shifts in the signals of the tool. These phase shifts result in a departure from the in-phase/quadrature phase relationship between the transmitter signal, the receiver signal and the phase reference signals, all of which are used in resolving the received signal into the quadrature component signals R and X.

Two principle sources of phase shift errors are present in induction logging tools—static phase shift errors and dynamic (temperature dependent) phase shift errors. Static phase shift errors are those phase shifts which occur when the tool is operating at a steady state temperature condition. These phase shift errors are introduced into the detected phase component signal by certain electrical circuits in the tool, i.e., the transmitter coil system, the receiver coil system, the amplifier used to condition the receiver signal and the PSD itself. The dynamic phase shift errors occur as a result of such influences as temperature drift in these same circuits, all of which are involved in the generation of the formation currents and in the detection of the phase components in the receiver signal. Unpredictable phase shifts may also be introduced by component variations that are an unavoidable consequence of the manufacturing process. High precision resolution of the component signals requires that these phase shift errors be automatically and periodically eliminated from the measurements during the logging operation. This is especially true since the temperature environment in which the induction tool is operated will vary over a wide range with the depth in the borehole.

The dynamic compensation for phase shift errors due to temperature drift in the circuits of an induction logging tool has been attempted in the prior art. U.S. Pat. No. 3,340,464 discloses a circuit for automatically adjusting for varying phase shifts due to temperature drift in the tool's circuits by deriving a test signal from the current in the transmitter coil; substituting this test signal for the normal receiver coil output signal; generating a quadrature reference signal to the PSD to detect a phase component (X) in the receiver signal; and, phase shifting the reference signal as a function of the magnitude of the detected phase component signal in a direction to minimize that signal. This disclosed phase error compensation circuit and method does not attempt to segregate the relatively fixed or constant phase errors of the tool from the temperature dependent phase errors which vary with time during logging and resulting from component drift in the circuits. Rather, the tool of U.S. Pat. No. 3,340,464 attempts to compensate for any and all phase shifts regardless of their source which have occurred since the last phase compensation.

As a result, the phase compensation circuit of U.S. Pat. No. 3,340,464 must compensate for the phase angle error over a greater range of angles than would be required if the static and temperature dependent phase shift errors were separately compensated. A large range in phase angle compensation results in less sensitivity to small phase shift errors. This loss of sensitivity allows uncompensated phase shift errors to appear in the detected phase component signal. These errors prohibit the high precision and accuracy in the measurements.

Those prior-art tools, such as those disclosed in U.S. Pat. Nos. 3,147,429 and 3,179,879, which measure both R and X require two PSDs, one for measuring R and one for measuring X. This dual arrangement of detecting circuits in an induction tool implies that the static and temperature dependent phase shift errors for each of the two PSD's will not be the same, i.e., the circuits will not respond identically to a given temperature change even if they could be made to have the same phase shift at a given temperature. Because of this difference, different phase shift errors will be present in the R and X measurements. Even with phase shift compensation techniques, such as that disclosed in U.S. Pat. No. 3,340,464, applied to the PSD circuits, one compensation circuit could not compensate for both detectors. Two compensation circuits would be required, one for each PSD. This, of course, would increase significantly the circuit complexity of the induction tool and a reduction in its overall reliability.

It is a characteristic of induction tools that at low conductivities, the amount of direct mutual coupling ("X" sonde error) between the transmitter coil and the receiver coil, even in a tool which employs a system of receiver coils which minimize this mutual coupling, is not zero. In fact, a ratio of 10:1 of the signal response due to direct mutual coupling to the R component in the receiver signal is not uncommon. When encountering low conductivities, in order to resolve the R component to ±1% accuracy, a phase accuracy of 1 milliradian is required. For the case of high conductivities, the R component will exceed X by a factor which can be substantial, i.e., "R"=10×"X". For this case, to resolve X to ±1% would likewise require a high degree of phase accuracy.

To obtain accurate phase component signal measurements that are essentially free of the static and temperature dependent phase shift errors, a highly phase stable, low distortion transmitter signal must be generated. A highly phase stable transmitter signal is required to insure phase accuracy between the signals of the tool in the generation of the transmitter signal and in the detection of the phase component signals in the receiver signal. The requirement for low distortion in the transmitter signal results from the frequency response of the earth's formations.

A known phenomenon in induction logging is the difference in the formation response as a function of frequency and formation conductivity. In general, the response signal received by an induction tool at low conductivities increases as the square of the frequency for a constant transmitter current. Because of the greater formation response at higher frequencies than at lower frequencies over most of the conductivities encountered, it becomes apparent that a low distortion transmitter signal is required. The more distorted the transmitter signal is, the larger in amplitudes are the harmonics of the fundamental frequency. Such harmonics propogate through the formation from transmitter to receiver with an attenuation and phase shift not related to those of the fundamental frequency. They can thus introduce false signals into the receiver that may cause a misleading result to be obtained from the induction tool measurement. Thus, more noise will be present in the resulting receiver signal from these higher frequency harmonics.

This variation in formation response with frequency can be put to good use to extend the range of formation resistivity that may be accurately measured by an induction logging tool. At high formation conductivities and higher frequencies, a phenomenon known as "skin-effect" causes a loss of proportionality between the received signal and formation conductivity, introducing additional complexity in the interpretation of the signals.

Additionally, at the lower transmitter frequencies and at low conductivities, the response from the formation falls below the noise level of the induction logging system. In this case, meaningful measurements are impossible. Thus, when encountering low conductivities, a high frequency for the transmitter signal would provide the more accurate reading of the formation conductivity. But, because of the sloping away of the response curves for the higher frequencies at higher conductivities, it would be desirable to have a lower transmitter frequency at high conductivities to avoid ambiguity in the conductivity derived from those measurements. This may be achieved by selection of a single frequency appropriate for the conductivity range expected prior to logging, or by the generation of two or more frequencies simultaneously in the transmitter, with subsequent frequency separation in each receiver circuit and in each phase selective detection circuit, or by sequentially switching to different frequencies while logging.

Yet another problem present in prior-art logging tools has been the problem of determining from the measured tool output responses the true and correct characteristic of the formation. That is, determining the transfer function of the tool relating the tool input signal, representative of the formation characteristic, to the measured tool output response. It is from this transfer function that the true value of the formation characteristic is inferred based on the measured output responses.

Because of variations in circuit parameters as a result of temperature changes, (e.g., changes in the amplifier gains) the calibrated transfer function of the tool at one operating position may not be the same as at another. A determination of the transfer function is normally effected uphole by placing one or more signal sources near the receiver coil to simulate various formation conductivities. The responses to these test signals are recorded and used to derive a calibration transfer function for the tool. This function is thereafter used as the function relating input to output of the logging tool. Yet, for prior-art tools, the data obtained during a logging run is not corrected for the effects of temperature changes, during logging, to the transfer function.

A further characteristic of all induction logging tools is the very wide dynamic range present in the detected phase component signals over which useful information is contained. A dynamic range of 10,000:1 (>80 db) is not uncommon. Superimposed on the useful information in a detected component signal is a certain amount of random noise which degrades the quality of any measurements made. In analog prior-art induction logging tools (as distinguished from a digital logging tool), this noise includes noise generated during the transmission of the detected analog phase component signals to the surface through a wireline logging cable. Analog transmission of the phase component signals uphole is subjected to the problem of signal degradation by the introduction of error potentials and noise or cross talk in the electrical leads of the logging cable.

Prior-art logging tools have attempted to handle the large dynamic range in the detected component signals in different ways. U.S. Pat. No. 3,056,917 discloses one such technique in which the dynamic range is divided into two parts—a first range in which the transmitter current is adjusted to obtain a constant receiver signal voltage and a second range in which the transmitter current is held constant. A signal is then recorded which is representative of the transmitter current when the receiver signal is constant, and which is representative of the receiver signal when the transmitter current is held constant. The resulting recorded signal represents the conductivity of the formation in the first range and the resistivity of the formation in the second. Yet other prior-art techniques for handling this large dynamic range in the detected phase component signals are also discussed in U.S. Pat. No. 3,056,917.

Most prior-art tools have used standard techniques to try to eliminate or minimize the amount of noise introduced into the analog signals transmitted over the logging cable. The use of twisted wire pairs, shielded leads, low noise slip rings, etc. are but a few. Where an induction tool requires precise, accurate measurements of the detected signals, regardless of their magnitudes, these prior-art techniques are no longer adequate.

Because of the limitations present in the prior-art logging tools and the need for more precise and accurate measurements of the phase quadrature components of the receiver signal, it would be advantageous to provide an induction logging tool to measure and convert to digital form downhole the wide dynamic range in the detected phase component signals, and to measure them with the same resolution and accuracy at all levels of signals. These digital signals are subsequently transmitted to the surface substantially uncorrupted by noise as previously discussed. It would also be advantageous to dynamically compensate for both the static and temperature dependent phase shift errors in the circuits of the tool involved in the generation of the formation currents and in the detection of the phase components of the receiver signal.

It would also be advantageous to provide an induction tool which digitally generates downhole both a highly phase stable, low distortion transmitter signal and a highly stable phase reference signal in order that a single phase sensitive detector may sequentially detect both the R and the X phase quadrature component signals while compensating for the phase shift errors. It would also be advantageous to provide a digital induction logging tool in which the frequency of the digitally generated transmitter signal is selectable from among a plurality of transmitter frequencies. It would also be advantageous to provide an induction tool which automatically selects, during a logging run, the transmitter frequency or frequencies that will produce the optimum formation response signals for the conductivities actually encountered by the tool. It would also be advantageous to provide an induction logging system which automatically produces, during a logging run, test calibration measurements which are used to derive a linearization correction function to correct for temperature dependent variations in the transfer function of the tool at any time during the logging run.

SUMMARY OF THE INVENTION

In accordance with the present invention, a digital induction logging tool is provided for measuring a characteristic of the earth's sub-surface formations by causing formation currents to flow in response to a transmitter signal of a predetermined frequency and by measuring a receiver signal generated in response to these formation currents. The digital induction tool obtains digital floating-point samples of phase quadrature components of the receiver signal at various depth points along the borehole. These samples are obtained by successively measuring in one phase sensitive detector circuit the component signal in-phase with the transmitter signal and the component signal in quadrature thereto. Means are included in the tool for automatically compensating for the phase shift errors in the phase quadrature component measurements introduced by circuits of the tool.

A surface located central processing unit (CPU) is programmed to produce characteristic data of the earth's sub-surface formations from the floating point digital samples obtained by the digital induction tool. The CPU transmits command information to the digital induction logging tool downhole to specify the operating modes and parameters for obtaining the floating point digital samples. A digital telemetry means is used to transmit the digital information between the induction logging tool and the CPU over a wireline cable suspending the induction tool in the well borehole.

The digital induction logging tool includes a transmitter coil that responds to a low distortion, phase stable sinusoidal transmitter signal to induce a magnetic field into the earth's sub-surface formations. This magnetic field causes eddy currents to flow in the formations. These eddy currents themselves produce magnetic fields. A receiver coil responds to the magnetic fields generated by the formation currents to generate a receiver signal indicative of a characteristic of the formations, i.e., the formation conductivity. A controller is included for controlling the internal timing and functional operations of the tool's circuitry. The controller responds to the digital command and control signals transmitted from the CPU located at the surface.

Also included in the digital induction logging tool is a waveform generator responsive to the controller for digitally generating a low distortion, phase stable sinusoidal transmitter signal from among at least two selectable transmitter frequencies. Selection of the transmitter frequency may be automatically controlled by the CPU, or under operator control where selection is made to obtain the more accurate reading of the characteristic of the earth's formations. Selection may be based upon the current value of the conductivity of the formations being encountered.

The waveform generator includes a read-only-memory which contains digital information representative of magnitude values of the transmitter signal to be generated. The read-only-memory responds to an address counter to output digital code words to a digital-to-analog convertor to generate a stair-step approximation to the desired sinusoidal transmitter waveform. The waveform generator also includes a filter connected to the output of the digital-to-analog converter for smoothing the stair-step sinusoidal waveform by filtering the harmonics therefrom. A transmitter amplifier amplifies the filtered sinusoidal waveform to obtain the low distortion sinusoidal transmitter signal that is actually applied to the transmitter coil. In one embodiment of the invention, the waveform generator is programmed to produce a waveform consisting of two different superimposed sinusoidal frequencies allowing for simultaneous multi-frequency logging.

The digital induction logging tool also includes an autophase unit that responds to the controller to generate a digital phase reference signal to a phase sensitive detector for resolving the receiver signal into its inphase and quadrature components. The phase reference signal successively changes from a first to a second phase relationship with the transmitter signal in response to commands from the controller. The first and second phase reference signals respectively having the first and second phase relationships being precisely orthogonal to one another. The autophase unit further includes first and second flip-flops interconnected such that the output signal from the first flip-flop (the phase reference signal) is phase shifted from the first phase relationship to the second phase relationship in response to control signals from the controller.

The digital induction logging tool also includes a phase sensing means responsive to the receiver signal and the phase reference signal from the autophase unit for successively detecting the phase quadrature components in the receiver signal. Each detected component is that component in-phase with the current phase of the phase reference signal. Included in the phase sensing means is the phase sensitive detector and a receiver amplifier for amplifying the signal from either the receiver coil or a test signal derived from the current in the transmitter coil. The phase sensing means also applies a feedback error signal to the autophase unit. The feedback error signal represents the magnitude of the detected component signal generated during an autophase cycle.

During each autophase cycle, a phase reference signal is generated for detecting the quadrature component of the receiver signal. Also generated during each autophase cycle is a test signal derived from the transmitter current. Based on the phase relationship between the test signal and the phase reference signal generated during an autophase cycle, the feedback error signal causes the autophase unit to phase shift the phase reference signal in a direction to reduce to zero the detected reactive component. The amount of phase shift applied by the autophase unit is retained at the completion of each autophase cycle thereby to compensate for phase shift errors introduced by circuits of the tool.

Also contained in the read-only-memory of the waveform generator are reference clock generating signals that are output along with the amplitude data. The reference clock signal is applied to the autophase unit and is used to generate the phase reference signal. The reference clock generating signals are stored in the read-only-memory relative to the transmitter signal generating data so that the resulting phase reference signal from the autophase unit is phase shifted relative to the transmitter signal to compensate for phase shift errors introduced by circuits of the tool.

The digital induction tool also includes a floating point analog-to-digital converter for successively obtaining floating point digital samples of the magnitude of the detected phase quadrature components of the receiver signal output from the phase sensing means.

Each floating point signal includes a digital word signal representing the exponent of a floating point number and a digital word signal representing its magnitude. The floating point analog-to-digital converter includes a voltage-to-frequency converter that generates a digital clocking frequency proportional to the magnitude of the component signal output from the phase sensing means. A counter counts clock cycles of the digital frequency signal during a predetermined time period. This predetermined time period represent an integration time over which the detected component signal is be integrated.

A shift register having a stage for each bit of the counter receives and stores the contents of the counter at the end of each predetermined time period. Responsive to shift pulses, the shift register shifts the resulting count in a direction to increase the magnitude of the count contained in a predetermined sub-set number of output bits of the shift register. This sub-set of bits has a sign bit and most significant bit (MSB), and forms the magnitude of each floating point digital signal. A second counter is also included for counting the number of shift pulses applied to the shift register. The shift register is shifted one bit position for each shift pulse. This shifting continues until the first to occur of either a logic 1 signal appearing in the MSB of the magnitude or the count in the second counter reaches a predetermined count (zero). The count in the second counter forms the exponent of each floating point digital sample.

BRIEF DESCRIPTION OF THE DRAWINGS

A digital induction logging tool constructed in accordance with the preferred embodiment of the invention is illustrated in the accompanying drawings in which.

FIG. 6 is a timing diagram for various signals of the floating point A/D converter illustrated in FIGS. 2 and 12;

FIG. 7 is a flow diagram of the controller firmware routine for generating a time interval;

FIGS. 8A and 8B are a firmware flow diagram for the firmware of the controller shown in FIGS. 5A and 5B;

FIG. 13 is an illustration of the autocalibration linearization technique; and

Similar reference numerals refer to similar parts throughout the several drawings.

DETAILED DESCRIPTION OF THE PREFERRED EMBODIMENT OF THE INVENTION

The Digital Induction Logging System

Figure 1:
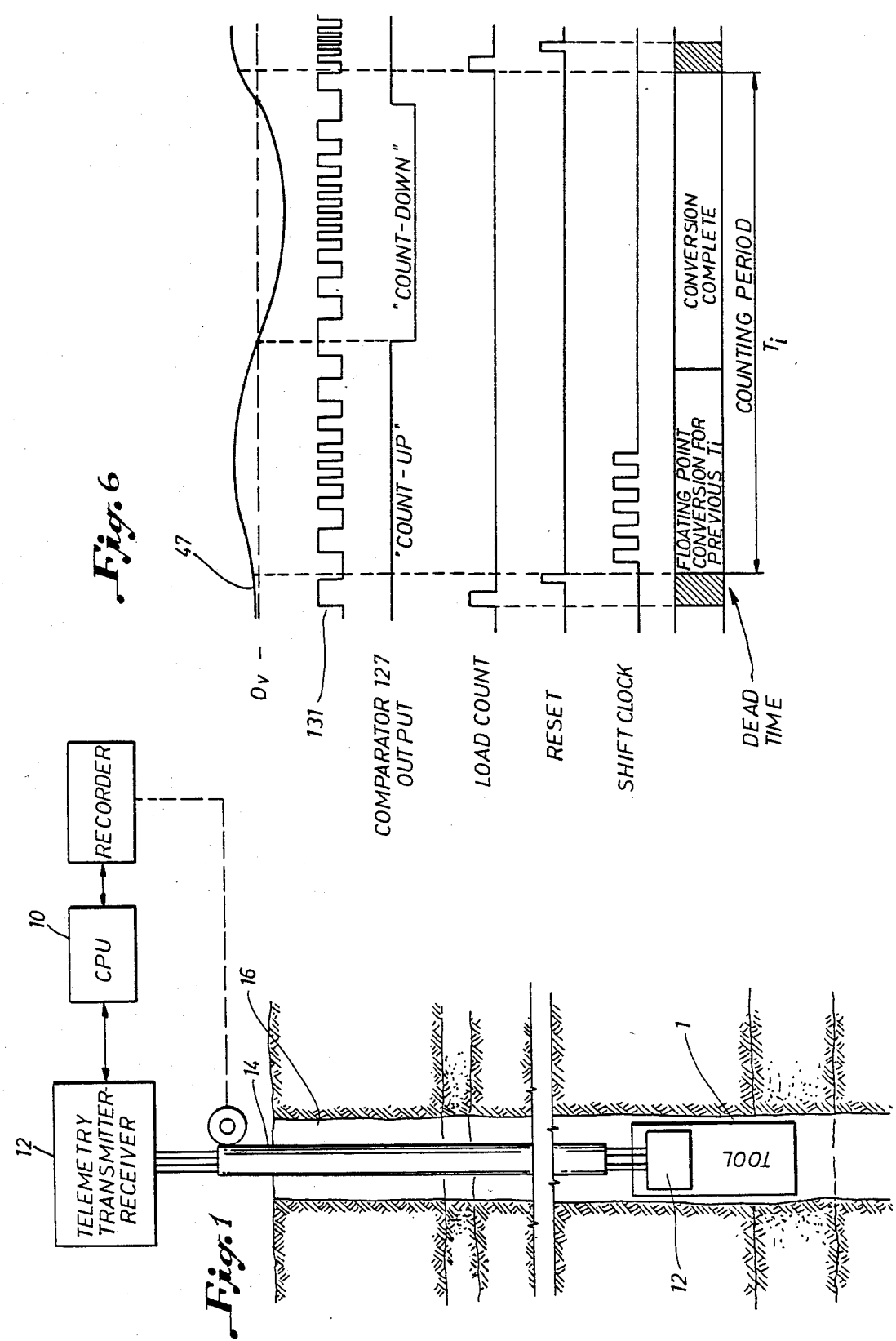
FIG. 1 is an illustration of a digital induction logging system in place for logging a borehole.

Referring now to the figures and first to FIG. 1, a pictorial representation of a digital induction logging system including the present invention is shown. A digital induction resistivity logging tool 1 in accordance with the invention is shown suspended in a well borehole 16 by a wireline cable 14. Associated with each end of the wireline cable 14 are telemetry transmitter-receiver units 12 which together comprise a telemetry means for transmitting and receiving digital information between a surface located central processing unit (CPU) 10 and the downhole digital induction tool 1. Telemetry transmitter-receiver units 12 operate to convey command and data information from the CPU 10 to the circuits of the digital induction tool 1, and to transmit and receive the floating point digital signals obtained by the digital induction tool 1. These digital samples represent a characteristic of the earth's sub-surface formations and are transmitted uphole to the CPU 10 for further processing.

By means of a suitable drum and winch mechanism (not shown) the length of cable which is suspended in the borehole may be either increased or decreased to provide the desired movement of the downhole apparatus through the borehole.

The Digital Induction Logging Tool 1

Figure 2:
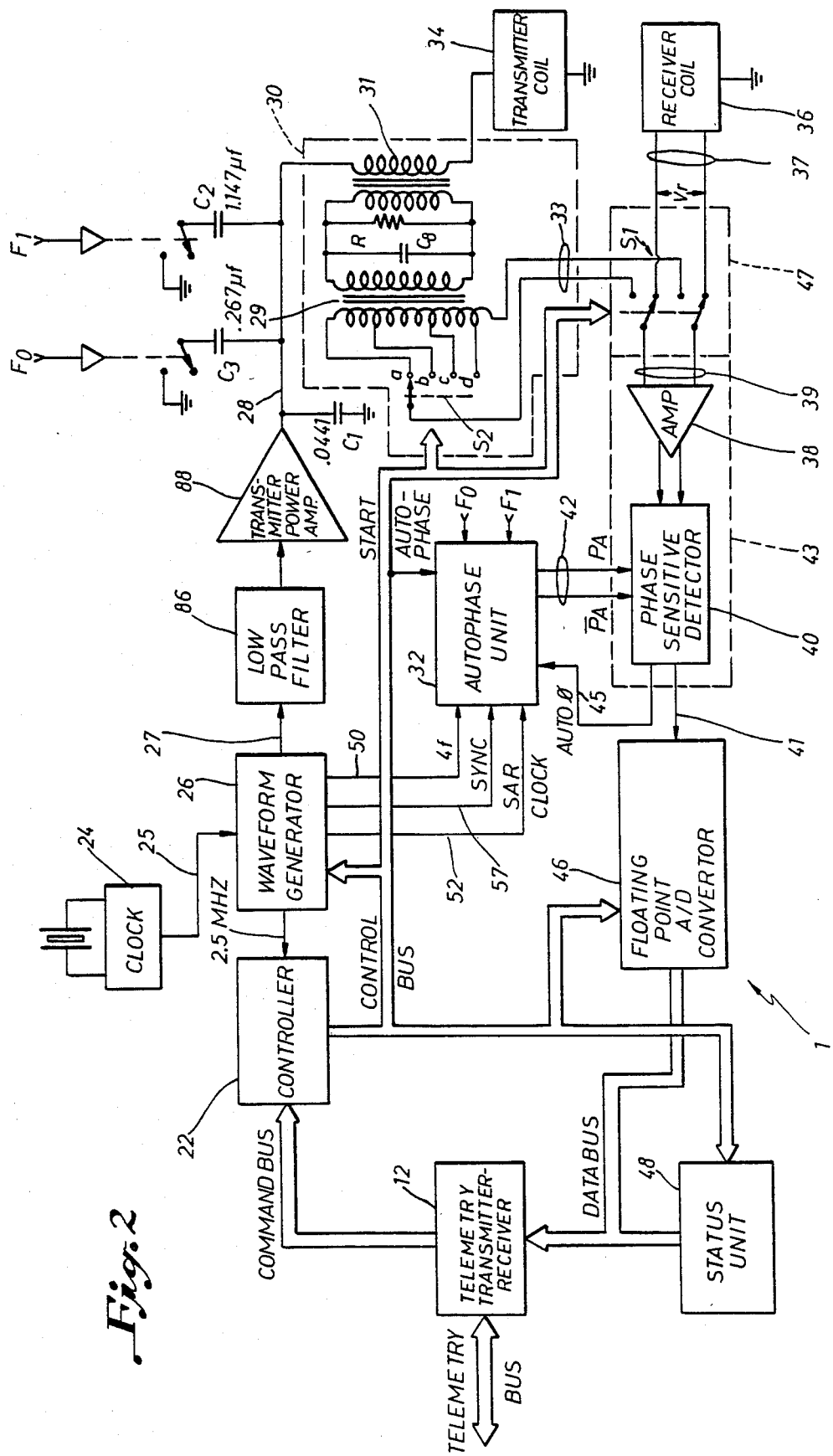
FIG. 2 is a functional circuit block diagram of the digital induction logging tool illustrated in FIG. 1.

Turning now to FIG. 2, a more detailed block diagram of the digital induction logging tool 1 is shown. The induction logging tool operates on principles that are well known to those skilled in the art and will only be briefly described herein. A transmitter coil 34 is excited with a AC varying transmitter current $i_T$. The presence of this transmitter current $i_T$ produces a magnetic field which propagates into the earth's sub-surface formations surrounding the induction tool 1 sonde. This magnetic field induces eddy currents to flow in the formations. Positioned proximate the transmitter coil 34, but electrically isolated from direct coupling of the magnetic field present in the transmitter coil 34, is a receiver coil 36. As a result of eddy currents flowing in the formations, magnetic fields are, in turn, generated. These magnetic fields are detected by the receiver coil 36. A receiver signal voltage 37 ($V_r$) is thus generated on the output of the receiver coil 36. This voltage is indicative of the conductivity of the formations. From this receiver signal 37, phase components will be obtained for further processing by the CPU 10 to obtain the desired characteristic of the sub-surface formations.

It should be pointed out that a single transmitter coil and a single receiver coil are shown in FIG. 2 for purposes of illustration and discussion of the invention. Although the invention is described with reference to single transmitter and receiver coil systems, the invention is equally applicable to systems which include multiple transmitter coils or multiple receiver coils or combinations thereof. For an example of an induction logging systems which incorporates multiple coil arrangements, see U.S. Pat. No. 3,150,314. Particular benefits are obtained from such coil systems. For example, modern coil arrays are designed to substantially eliminate receiver voltage signal due to mutual inductive coupling (X sonde error).

The circuits illustrated in FIG. 2 perform their functions under control of a controller 22. The telemetry transmitter-receiver unit 12 responds to the telemetry bus data from the wireline cable 14 to apply the command and data information from CPU 10 to controller 22. This data specifies the modes and parameters of the induction tool. A quartz crystal controlled clock oscillator 24 provides the master system timing signal 25 that is applied to the controller 22 via a digital waveform generator 26. Digital waveform generator 26 divides clock signal 25 before applying it to the controller 22. From clock 24 is derived all of the circuit timing signals. Synchronization and control of the various functional blocks depicted in FIG. 2 by controller 22 is described in more detail below.

Still referring to FIG. 2, a waveform generator 26 responds to the system clock 25 to produce a stair-step approximation to a sinusoidal waveform on lead 27 which ultimately will become the AC transmitter signal on lead 28 applied to the transmitter coil 34. The frequency of the transmitter signal is selectable from among a plurality of frequencies which waveform generator 26 is capable of generating. Frequency select signals may be supplied from the surface at any time during downhole operations to select the desired transmitter frequency. In addition to generating a stair-step approximation to the transmitter signal, waveform generator 26 also provides several clocking signals to an autophase unit 32. Autophase unit 32 has two primary functions: First, to generate the phase reference signal 42 to a phase sensitive detector 40. The phase reference signal 42 enables that detector to detect the phase quadrature component signals of the receiver signal 37. Second, to phase shift the phase reference signal 42 in a direction to minimize the output signal from the phase sensitive detector 40 during a phase compensation cycle. Minimizing the output of detector 40 eliminates phase shift errors introduced by certain circuits of the tool.

Connected to the output of the waveform generator 26 is a low pass filter 86 which filters the harmonic content of the stair-step approximation signal on lead 27. The output of low pass filter 86 is then applied to a transmitter power amplifier 88 which amplifies and applies a sinusoidal transmitter signal on lead 28 to the transmitter coil 34. Connected between the output of transmitter power amplifier 88 and circuit ground is a capacitor C1 which functions to apply a power factor adjustment to the transmitter signal on lead 28. Two additional capacitors, C2 and C3 may be connected in parallel with capacitor C1 via solid state switches responding to the frequency select signals $F_0$ and $F_1$. Since one of the features of the digital logging systems according to the present invention is the capability of selecting a transmitter frequency from among a plurality of transmitter frequencies (described in more detail below), capacitors C2 and C3 are provisonally provided to provide the additional power factor compensation to the output of the transmitter power amplifier 88 as a function of the selected transmitter frequency, and thus reduce the power consumption (and heat dissipation) of the transmitter.

Connected in series with the output of the transmitter power amplifier 88 is a primary winding of a current transformer 31. Also connected in series with the primary winding of transformer 31 is the transmitter coil 34. The transmitter current $i_T$ also flows in the primary winding of current transformer 31. Connected across the secondary winding of transformer 31 is a parallel combination of resistor R and capacitor C8. The voltage signal developed across R functions as a test reference voltage sampled from the current flowing in the transmitter coil 34. From this reference signal will come the test signals used in autophase compensation for phase shift errors introduced by measurement circuits in the tool and for autocalibrating the transfer function of the tool Capacitor C3 function to apply a small amount of phase shift to the reference test signals generated across R. This phase shift is intended to duplicate the phase shift that is present in $V_r$ at the output of the receiver coil 36 due to the imperfectness of the coils 34 and 36.

Connected across R and C is the primary winding of transformer 29. The secondary of transformer 29 has a plurality of output taps labeled a, b, c and d, each tap generating a different voltage level. A controllable switch S2 selects from among the output tap point of transformer 29 to obtain the test signal 33.

Still referring to FIG. 2, receive coil 36 is shown with the the receiver voltage $V_r$ at its output terminals. As previously discussed, $V_r$ is generated in response to the magnetic fields produced by the eddy currents flowing in the formations. In normal operation, the receiver voltage on lead 37 is applied through a controllable switch S1 as the input to a receiver amplifier 38. The output of the receiver amplifier 38 is applied as the input voltage to the phase sensitive detector 40. Phase sensitive detector 40 and preamplifier 38 comprise a phase sensing means 43 that is used to detect the quadrature phase component signals, R and X, in the receiver signal $V_r$.

In order for phase sensitive detector 40 to detect these phase component signals, a phase reference signal 42 having the same phase as the phase of the component to be detected must be generated and applied to the phase sensitive detector 40. The phase relationship between the phase reference signal 42 and the current in the transmitter coil 34 ($i_T$) determines which phase component of the receiver signal will be detected. For the present invention, a single phase sensitive detector 40 sequentially detects both quadrature phase components of the receiver signal, i.e., the phase component that is in-phase with $i_T$ and the component that is orthogonal thereto. For phase sensitive detector 40 to sequentially detect both quadrature components, it is necessary to sequentially generate the phase reference signal 42 alternately having two phase relationships to $i_T$. First, a phase relationship that will produce the in-phase phase component signal R, and second, a phase relationship that will produce the orthogonal phase component X. To insure orthogonality between the R and X components, the phase change between the first and second phase relationships must be precisely 90°.

The autophase unit 32 responds to clocking signals from waveform generator 26 and to the controller 22 to produce the phase reference signal 42 having the sequential phase relationships to the transmitter current $i_T$. Waveform generator 26 outputs, in a predetermined phase relationship to the generated sinusoidal transmitter waveform on lead 27, a referenced clock signal on lead 50 (4f) that is used by autophase unit 32 to generate the square wave phase reference signal 42. A more detailed description of the circuitry of the autophase unit 32 is given below.

Still referring to FIG. 2, two outputs are produced by the phase sensitive detector 40, an analog signal on lead 41 representing the detected phase component signal in the receiver signal 37 and a feedback error signal AUTO$\phi$ on lead 45. The detected phase component signal is applied to a floating point analog-to-digital convertor 46 while AUTO$\phi$ is applied to the autophase unit 32. The signal AUTO$\phi$ is a feedback digital signal indicative of the polarity of the detected phase component signal. This feedback error signal functions as part of a closed loop control system that is used to adjust the phase of the phase reference signal 42 to compensate for variable phase shift errors (mostly temperature dependent) of the circuits of the tool involved in the generation of the transmitter signal and in the detection of the phase component signals in the receiver signal on lead 37.

Ideally, if the circuits of the tool transmitter and receiver coils and downhole electronics were ideal (not subject to temperature drift, all inductors were pure inductance, etc.), the phase of the components in the receive signal 37 would be predictable and constant. Unfortunately, such an ideal world does not exist. As a result, phase shift errors are introduced into the various signals of the tool that are not predictable. Basically, two different sources of phase shift errors are compensated for with the apparatus according to the invention. Those phase shift errors introduced by the circuits of the downhole coils and electronics when measured at a fixed temperature and operating condition are defined as "the static sonde phase shift errors." Those phase shift errors introduced by such things as temperature drift are defined as "dynamic phase shift errors." These dynamic phase shift errors act to modulate the static phase shift errors. In the present invention, these static phase shift errors are compensated for by a predetermined phase shifting of the referenced clock signal on lead 50 relative to the digitally generated transmitter signal on lead 27, both signals generated by the waveform generator 26. As is more fully discussed below, the digital data used to generate both the referenced clock signal on lead 50 and the transmitter signal on lead 27 are stored in a read-only-memory relative to one another such that the desired phase shift to compensate for these static phase shift errors result when the contents of the memory locations are read out. In a sense, the phase shifting of the referenced clock signal on lead 50 relative to the transmitter signal on lead 27 comprises a first order phase shift correction to the total phase shift error that is present in the coil and electronic circuits, both static and dynamic. The static phase shift correction is also adapted to the frequency selected for the transmitter, because the coils and electronics introduce a frequency dependent phase shift.

The autophase unit 32 includes a means for phase shifting the phase reference signal on lead 42 by phase shifting the reference clock signal on lead 50 from which the phase reference signal on lead 42 is derived. Normal operation of the digital induction tool according to the invention is interrupted periodically by an autophase cycle during which corrections to the phase relationship of the phase reference signal on lead 42 and the transmitter current $i_T$ are made to compensate for the temperature dependent phase shift errors present in the phase sensing means 43. This is in effect a second order phase shift error compensation.

During each autophase cycle, controllable switch S1 which is part of selecting mean 47 is controlled by the controller 22 to select the test signal on lead 33 which is derived from the transformer 31. This test signal on lead 33 is applied as the input signal to the receiver amplifier 38, and functions as a reference signal with a known phase relationship to the transmitter current $i_T$. Responsive to the command START AUTOPHASE from the controller 22, autophase unit 32 generates a phase reference signal 42 having an approximately 90° phase relationship to the test signal 33. If there was no change in the phase shift introduced by the phase sensing means 43 from the last autophase cycle, the detected output phase signal on lead 41 should be at or near zero. For such a condition, no further phase shifting to the phase reference signal 42 is needed in this autophase cycle. However, if the signal on lead 41 is not zero, AUTO$\phi$ will generate a feedback error signal to the autophase unit 32 enabling the phase shifting means 95 contained therein (refer to the discussion with reference to FIG. 11) to adjust the phase of the phase reference signal 42 in a direction to minimize or reduce the magnitude of the detected phase signal on lead 41 back to zero. At the end of each autophase cycle, autophase unit 32 retains the amount of phase shift applied to the phase reference signal on lead 42 until the next autophase cycle. Thus, temperature dependent drifts, and the like, in phase shift error introduced by the phase sensing means 43 will be dynamically compensated for.

As shown in FIG. 2, the detected phase component signal produced by the phase sensitive detector 40 is applied to a floating point analog-to-digital converter 46. The resulting digital samples are then transmitted via the telemetry transmitter-receiver unit 12 to the surface located CPU 10. A detailed description of the circuits and operation of the converter 46 is given below with reference to FIG. 12.

The Controller 22

Figure 5A:
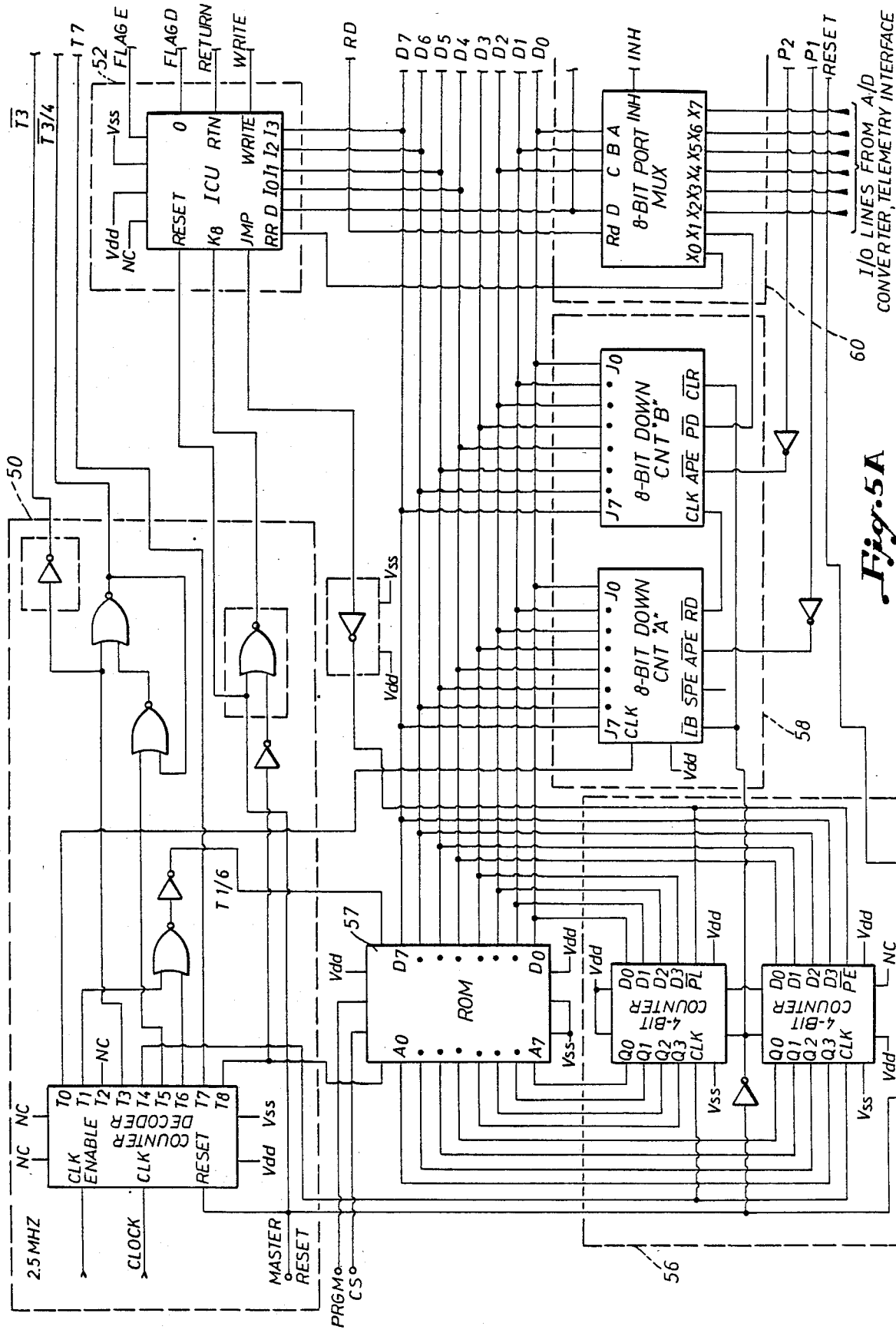
FIGS. 5A and 5B are a more detailed circuit diagram of the controller illustrated in FIG. 1.
Figure 5B:
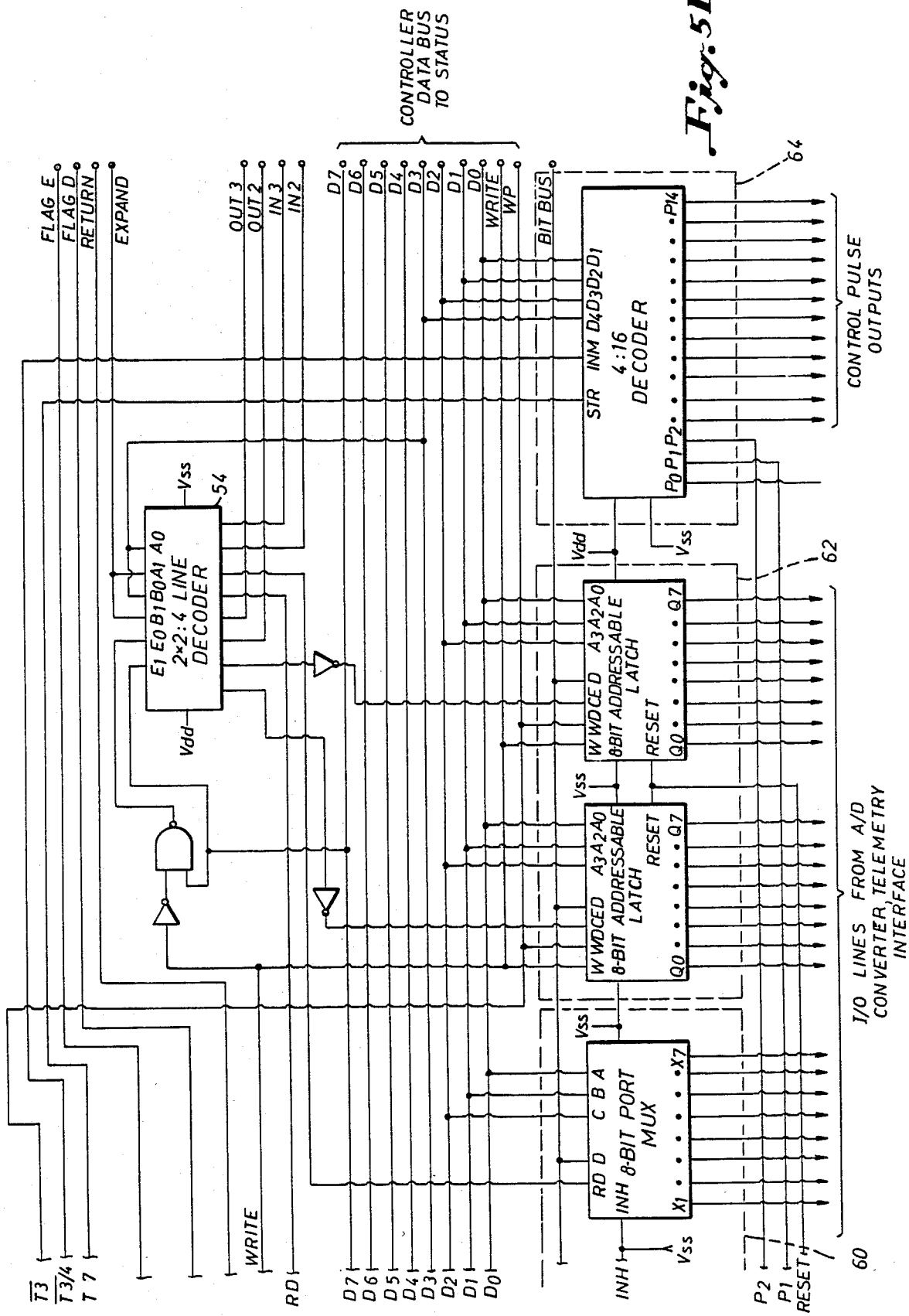

Turning now to FIG. 5, a detailed circuit diagram of controller 22 is shown. Controller 22 is a general purpose stored program controller in which firmware routines are contained in a read-only memory ROM 57. Controlling the internal timing sequencies of the controller 22 is a state controller 50 that responds to a 2.5 MHz clock signal from waveform generator 26 to produce the various state timing signals shown in FIG. 6. These timing signals are used to control the sequencing of the circuits illustrated in FIG. 5. Among other functions, controller 22 operates to generate control pulses on a number of output lines; sets logic levels in a number of input lines and responds to these signals; generates variable time delays using an internal counter which responds to a clock developed from the system clock; transfers 8-bit words directly from memory to external circuits; jumps to arbitrary program locations within the firmware ROM 57 under program control or using an externally generated 8-bit address (vectored jumps); and, performs simple boolean operations on two binary bits. With these functions, the controller 22 controls the internal operations of the induction tool through an orderly sequence of events, such as timed measurements; complex serial bit operations and floating-point conversions; and, the generation of control pulses for telemetry interface tasks in the telemetry transmitter-receiver unit 12.

A counter 56 consisting of an 8-bit up counter (two 4-bit up counters connected in series) with parallel load input is used to implement the program counter function. Program counter 56 addresses ROM 57 to access each program instruction. When the controller encounters a "jump" instruction, the new program counter value is loaded into counter 56 via the D0-D3 data input lines of the two 4-bit counters.

The heart of the controller 22 is an instruction decoder unit 52 which, for the presently preferred embodiment of the invention, is a Motorola MC-14500 Industrial Control Unit (ICU) which is described in detail in the publication "Motorola MC-14500B Industrial Control Unit Handbook," authored by Vern Gregory and Brian Dellande and published in 1977 by Motorola, Inc. The ICU 52 recognizes a set of only 16 instructions.

A program is stored in ROM 57 in the form of alternate instructions and address words which are output on the controller data bus 65. This interleaved structure allows for higher operating speed and a reduction in the number of interconnection wires. The first 4-bit nibble of each 8-bit instruction word is accepted by the ICU 52, and the second nibble forms an address to a one-of-16 decoder unit 64 to generate a pulse on one of 16 output lines. The succeeding address word in each program instruction is used to define an input or output port through which the controller communicates with an external circuit. Table 1 below illustrates the program instruction storage for the ROM 57.

TABLE 1

| ROM Address | Output Bits from ROM ||||||||  Program Location |
|---|---|---|---|---|---|---|---|---|---|
| | D7 | D6 | D5 | D4 | D3 | D2 | D1 | D0 | |
| 0 | ICU instruction |||| Decoder 64 address |||| 1 |
| 1 | | | | | data | | | | |
| 2 | ICU instruction |||| Decoder 64 address |||| 2 |
| 3 | | | | | data | | | | |
| 4 | ICU instruction |||| Decoder 64 address |||| 3 |
| 5 | | | | | data | | | | |
| 6 | | | | | | | | | 4 |
| 7 | | | | | | | | | |

A "read" or "write" instruction allows the ICU 52 to obtain one binary bit through the input multiplexer 60 or to load one binary bit in an output register via addressable latches 62 and decoder 64. Programmable time delays are generated by controller 22 by loading a 16-bit down counter 58 with two 8-bit data words. Counter 58 consists of two 8-bit down counters connected in series, counter A and counter B. The period can be set from $2^0$ to $2^{16}$ major clock cycles, corresponding to a range of 3.2 microseconds to 209 milliseconds with an input clock of 2.5 MHz. One instruction that is particularly useful in the controller 22 allows for an external circuit (such as a counter) to control the data bus and thereby to load a new number into the program counter, giving a "vectored jump." This is equivalent to an interrupt in the normal operation of the stored program.

Referring now to FIG. 7 which illustrates the program flow diagram to generate a specified time delay T by controller 22, the count number, C, representing the number of clock cycles to be counted by down counter 58 must be separated into two bytes destined for each half of the counter 58. Counter A handles the most significant byte and counter B (which must be loaded first) the least significant. The output from the counters is a zero detect bit ZD which is fed back to the X1 input of multiplexer 60. The zero detect bit is obtained from counter A (most significant byte). To obtain the correct count, this bit must go low (indicating that counter A is empty) and then go high (indicating that both counters A and B are empty). Both states must be detected to define the instant of the rising transition or the point at which both counters are at zero. The following is an example of the programming of ROM 57 to generate a time delay of 80 milliseconds with a 2.5 MHz system clock according to the flow diagram of FIG. 7: First, the counter 58 must be loaded with the number of clock cycles to be counted.

| Program Location | Machine Code | Action |
|---|---|---|
| 20 | 01 | load counter B |
| | A8 | least significant byte |
| 21 | 02 | load counter A |
| | 61 | most significant byte |

The zero detect bit $\overline{ZD}$ must now be loaded and tested. This uses the ICU instructions "load I/0 bus into result register (RR)" and "skip if RR is zero", if not "loop back." The ZD information is available on input port 1 with an address of 01 and the instruction code "1".

| Program Location | Machine Code | Action |
|---|---|---|
| 22 | IF | I/O bus to RR |
| | 01 | input port 1 $(\overline{ZD})$ |
| 23 | EF | skip if RR = O |
| | 00 | |
| 24 | CF | jump to program |
| | 22 | location 22 |

The machine will sit in this loop until the counters reach zero, at which time the instruction at location 24 is skipped and the routine is continued. Next, the zero detect bit is tested until it goes high using the same operation as described above except that the complement of the zero detect bit is loaded:

| Program Location | Machine Code | Action |
|---|---|---|
| 25 | 2F | complement of I/O bus |
| | 01 | input to RR 1 |
| 26 | EF | skip if RR = O |
| | 00 | |
| 27 | CF | jump to program |
| | 24 | location 25 |

When the $\overline{ZD}$ bit of counter A again return to a logic high, both counters will then be at zero and the desired time interval will have been generated and the program will jump out of the loop to the next instruction following location 27.

Figure 8B:
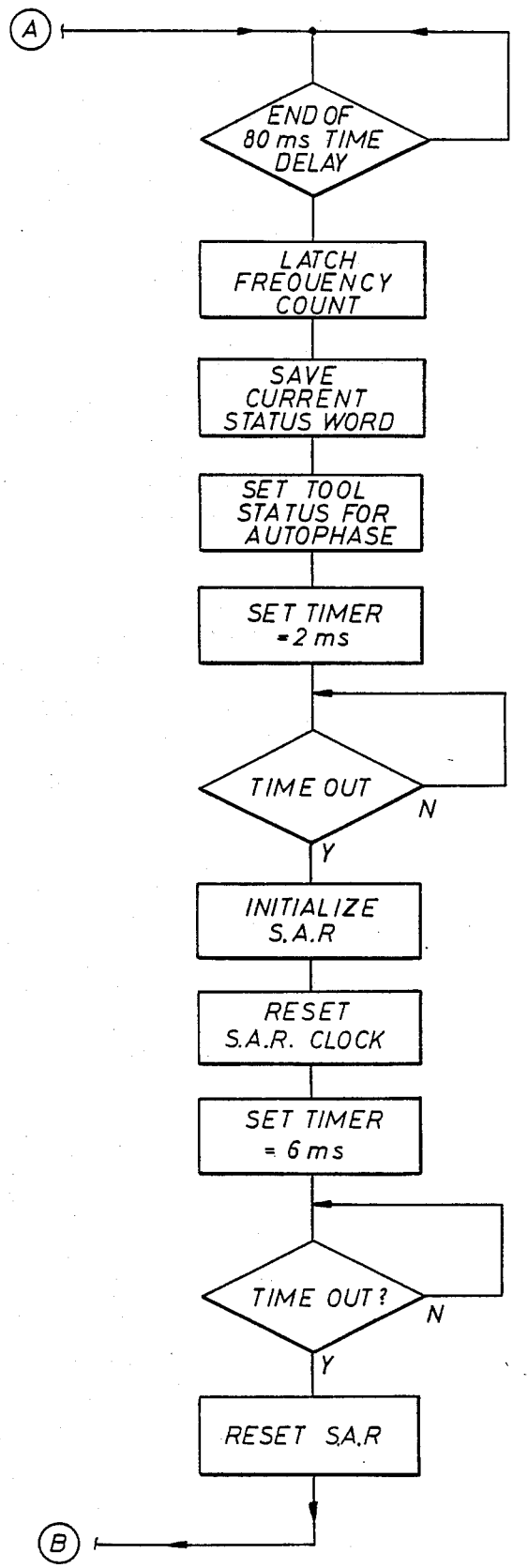

Illustrated in FIG. 8 is the firmware program flow diagram for the preferred embodiment of the present invention. Shown at various points of the diagram are "time out" blocks which represent a variable time delay generated in the same manner as the above described example.

The Waveform Generator 26

As previously discussed with reference to FIG. 2, the digital waveform generator 26 produces a stair-step approximation to a sinusoidal waveform. This waveform is then filtered by a low pass filter 86 and amplified in a power amplifier 88 to produce a low distortion, highly stable sinusoidal transmitter signal that is applied to the transmitter coil 34. The frequency of the transmitter signal is selectable from among a plurality of transmitter frequencies, e.g., 10 KHz, 20 KHz, 40 KHz, which waveform generator 26 is capable of generating.

A low distortion transmitter signal is desirable because, as will be seen below, the amplitude response of the receiver coil increases as the square of the transmitter frequency. Accordingly, the higher the harmonic content, the greater the distortion will be in the received signal.

Figure 3:
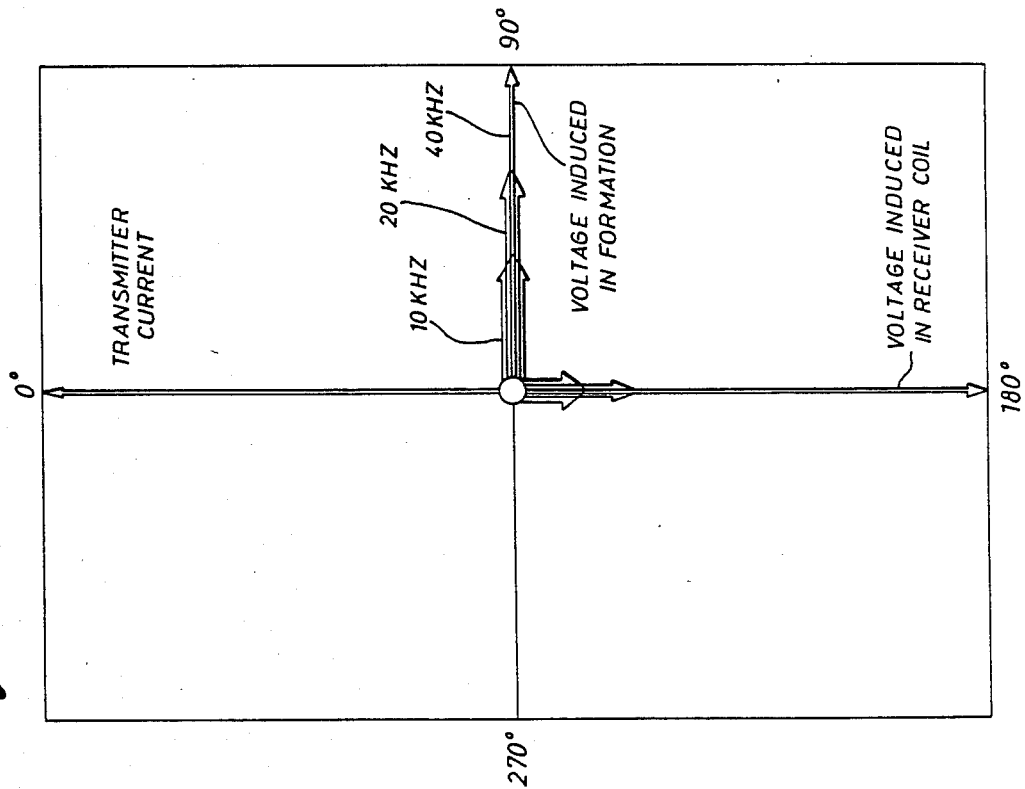
FIG. 3 is a phase diagram illustrating how the voltage induced in the receiver coil system varies as a function of the transmitter current frequency.

Illustrated in FIG. 3 is a vector diagram showing the phase relationship between the transmitter current $i_T$ and the voltage that is induced into the formation and the voltage that is induced into the receiver coil 36 for various transmitter frequencies. It has been appreciated for some time by those skilled in the art that improved measurements in the resistivity of a high conductivity formation (where skin-effect phenomenon significantly effects the response) would be achieved at lower transmitter frequencies (on the order of 10 KHz) while an improved measurement of low conductivity formations (where skin-effect does not significantly effect the response) can be improved by raising the frequency (on the order of 40 KHz) because the amplitude response of the receiver signal, or sensitivity, of an induction tool varies as the square of the frequency of the transmitter current. As used herein, "sensitivity" is defined to be the receiver coil 36 voltage divided by the transmitter coil current at a given formation conductivity and frequency, e.g., 10 uv/A at 1 mmho and 20 KHz. Because of this increase in receiver signal with increased frequency, the need for low harmonic content in the transmitter signal is easily recognizable in order to minimize distortion in the receiver signal $V_r$. A further need for low distortion results from the fact that the harmonics of the fundamental frequency transmitted propogate through the formation with an attenuation and phase shift not related to those of the fundamental frequency. They can thus introduce false signals into the receiver that may cause a misleading result to be obtained from the induction tool measurement.

In addition to digitally generating the low distortion, phase stable transmitter signal on lead 28, the digital waveform generator 26 also produces a reference clock signal on lead 50 that is applied to the autophase unit 32. The clock on lead 50 is used by autophase unit 32 to generate the phase reference signal on lead 42 to phase sensitive detector 40 to detect the desired phase components of the receive signal on lead 37. Additionally, the phase reference clock on lead 50 is generated with a phase shift relative to the generated transmit signal on lead 28 (see FIG. 10) so that the static sonde phase shift errors, as previously defined, are compensated for. In other words, by phase shifting the clock on lead 50, the detected phase component signal on lead 41 will not contain static phase shift errors introduced by the circuits involved in the generation of the transmitter signal and in the detection of the phase component signals in the receiver signal $V_r$ on lead 37.

Figure 9A:
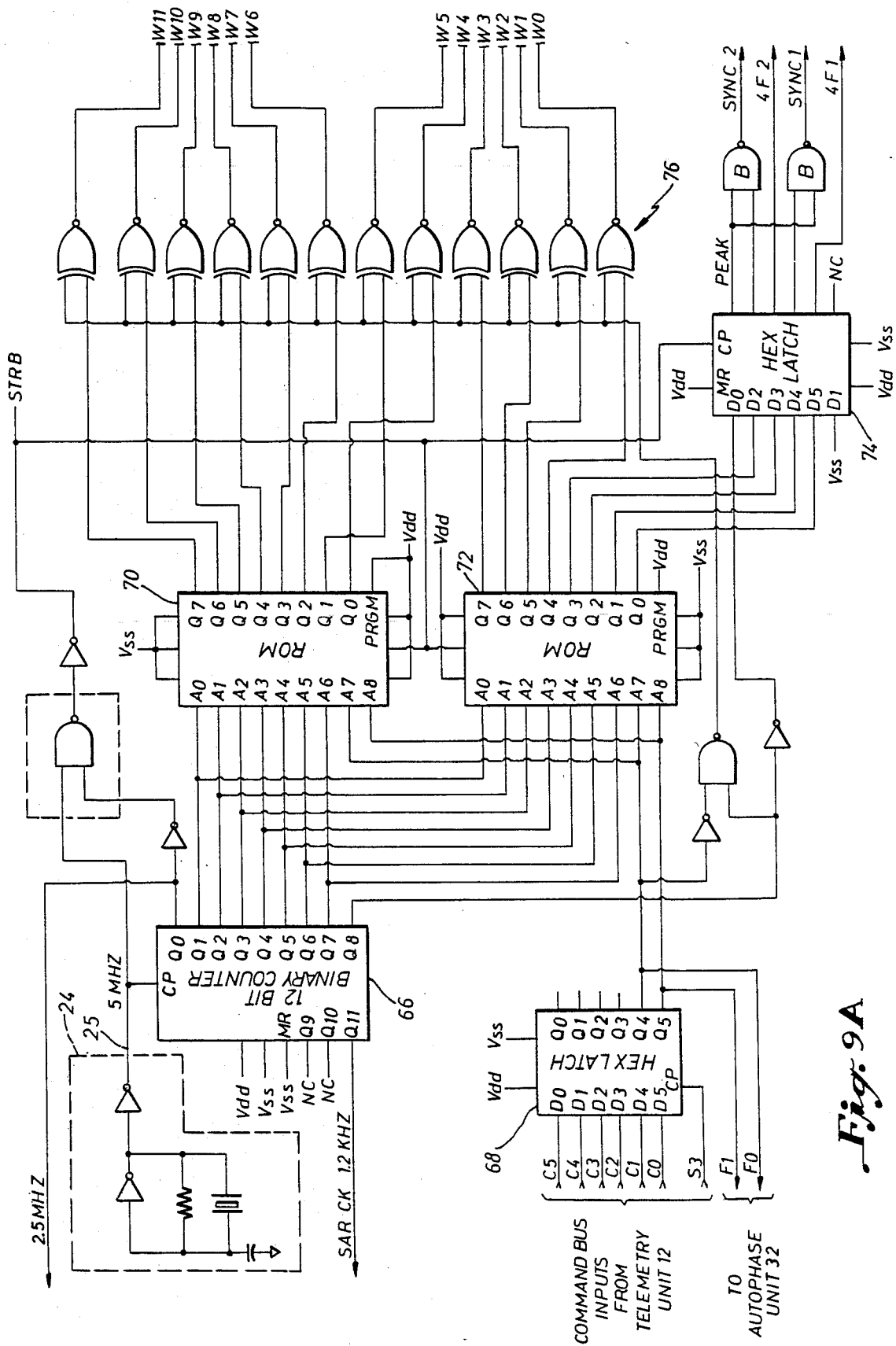
FIGS. 9A and 9B are a more detailed circuit diagram of the digital waveform generator which generates the transmitter signal.
Figure 9B:
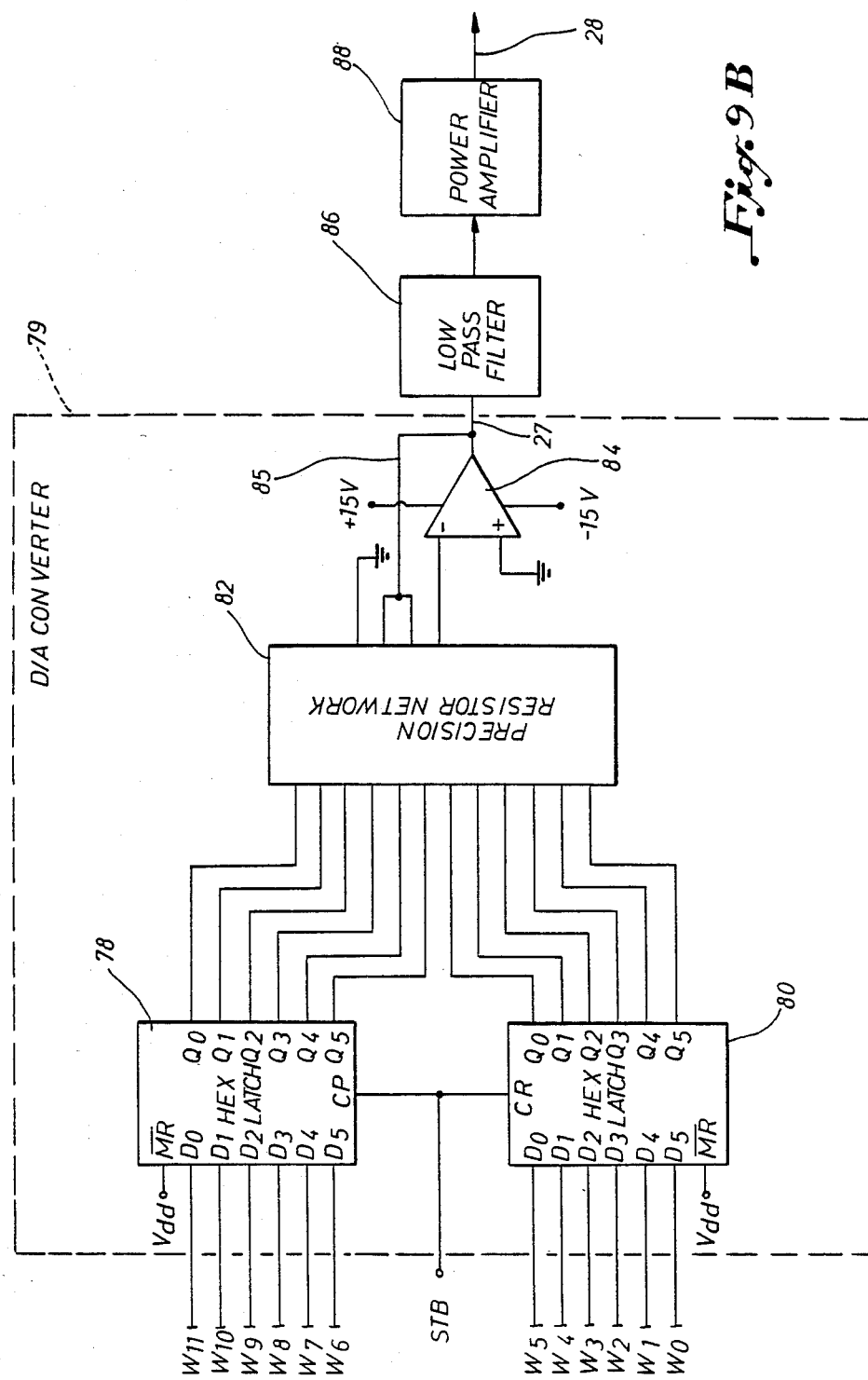

The description of the method by which the digital waveform generator 26 produces the low distortion, highly phase stable transmitter signal and the phase shifted reference clock signal on lead 50 can best be understood by referring now to FIG. 9. FIG. 9 shows a detailed circuit diagram of the digital waveform generator 26. Also illustrated is the circuit for the crystal controlled clock 24 shown in FIG. 2. The output of clock 24 is applied to a 12-bit binary counter 66. Counter 66 functions both as the ROM 70,72 address generator, and as a clock signal generator to the controller 22 (2.5 MHz) and to autophase unit 32 (SAR CLOCK).

Generation of the digital stair-step approximation waveform on lead 27 and the generation of the reference clock signal on lead 50 are specified by digital code words stored in ROM memory chips 70,72. These two memory chips form a 512×16-bit ROM. The output from the 12-bit binary counter 66 is used to address ROM 70,72 to output these stored digital code words. A set of exclusive OR gates 76 respond to the output from ROM 70,72 to generate digital codes that represent magnitude values of the transmitter signal to be generated. These digital code words are applied to a digital-to-analog convertor 79 containing input latches 78,80 that store, for one clock cycle, the magnitude code words. An R-2R precision resistor network 82 responds to the output from latches 78,80 to generate an analog voltage according to each stored digital code word. Operational amplifier 84 responds to the output current of the precision resistor network 82 to generate an output analog voltage. As the address counter 66 cycles through its addresses, the stair-step waveform on lead 27 (see also FIG. 10) is produced on the output of the digital-to-analog convertor 79. This signal is filtered in low pass filter 86 and amplified in power amplifier 88. The output from power amplifier 88 comprises the analog sinusoidal transmitter signal on lead 28 that is applied to the transmitter coil 34 to produce the transmitter current $i_T$.

In addition to the magnitude code words output from ROM 70,72, the ROM also outputs data to generate the reference clock signal on lead 50. By appropriately selecting the memory address locations into which the reference clock signal generating data is stored relative to the stored magnitude code words for the digital stair-step approximation waveform, it is possible to produce a reference clock signal on lead 50 that is phase shifted a predetermined amount relative to the resulting sinusoidal transmit signal on lead 28. By knowing the amount of static phase shift error that is to be compensated for, the ROM 70,72 can be appropriately programmed.

As previously mentioned, digital waveform generator 26 illustrated in FIG. 9 further includes the capability of generating a transmitter signal 28 having a frequency selected from among a plurality of predetermined frequencies. Hex latch 68 is shown in FIG. 9 responding to the command bus inputs from the telemetry transmitter-receiver unit 12. Commands transmitted from the CPU 10 located on the surface cause certain bits on the output of latch 68 to control two bits of addressing for the ROM 70,72. These two bits of address control will determine the frequency of the transmitter signal on lead 28. When the conductivity range of the formations in a particular location is approximately known, the operator can manually select from among the plurality of possible transmitter frequencies the transmitter frequency that will give the best accuracy.

Figure 14:
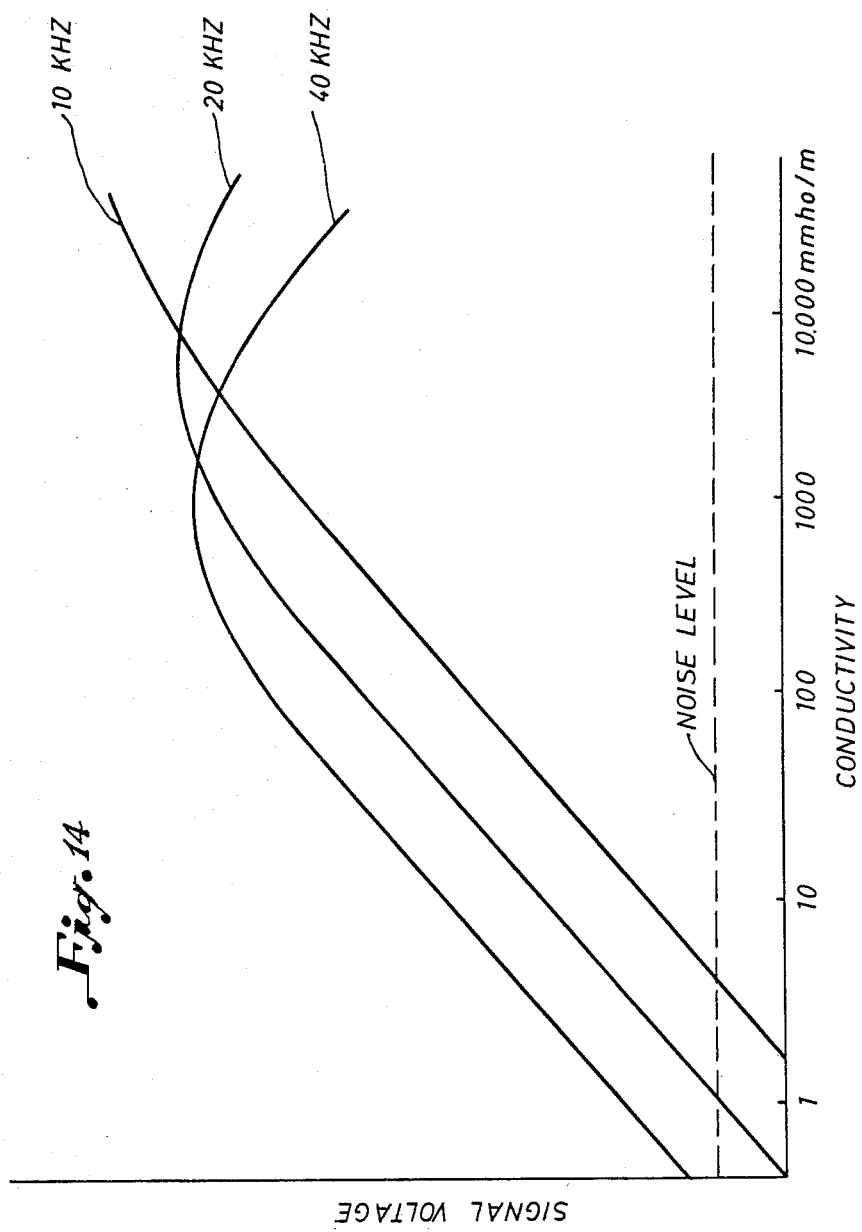
FIG. 14 is a graph of the receiver signal versus formation conductivity for different transmitter frequencies.

In this regard, FIG. 14 illustrates the relationship between receiver signal and formation conductivity for various transmitter frequencies. As previously discussed, at the lower transmitter frequencies and at low conductivities, the response from the formation falls below the noise level of the induction logging system, making meaningful measurements impossible. Thus, when encountering low conductivities, a high frequency is most desirable. As shown in FIG. 14, at high conductivities, a lower frequency is most desirable because of the sloping away of the response signal at the higher transmitter frequencies.

In addition to the manual selection of the transmitter frequency, the CPU 10 can automatically select the transmitter frequency which will give the best measurement based on such parameters as the actual conductivity being measured. For example, the following Table 2 illustrates a conductivity-frequency schedule which is advantageous for selecting frequencies according to the invention:

TABLE 2

| Measured Conductivity (mmho/m) | Frequency (KHz) |
| --- | --- |
| 2 to 10000 | 10 |
| 1 to 5000 | 20 |
| .2 to 1000 | 40 |

Thus, for high conductivity a low transmitter frequency (10 KHz) could be selected to take advantage of the greater linearity of response to high conductivity formations, and vice versa (40 KHz) when encountering low conductivity. In a third version, the waveform generator is programmed to produce a waveform consisting of two different superimposed sinusoidal frequencies. This allows for simultaneous multi-frequency logging. For such a case, in order to detect the formation response to each transmitter frequency according to the present invention, the phase shifting feature of waveform generator 26, autophase unit 32 and the phase sensing means 43 must be duplicated, one combination for each frequency.

The present invention includes a means in the waveform generator 26 to generate any one of a plurality of transmitter frequencies or a combination of two or more frequencies in response to digital commands from the CPU 10. As shown in FIG. 3, the three frequencies illustrated for the transmitter signal for the presently preferred embodiment of the invention are 10 KHz, 20 KHz and 40 KHz. In order to produce these frequencies, with each having the same amplitude and with each generated from the same sequence and rate of addresses from address counter 66, ROM 70,72 has been specially programmed for each frequency. For a specific sequence of memory addresses, ROM 70,72 generates one-half of a cycle of the 10 KHz frequency, one complete cycle of the 20 KHz frequency and two complete cycles of the 40 KHz frequency. This specific sequence includes the sequence through the possible memory addresses formed by the seven lower order bits, A0–A7, of the 9-bit address for the ROM 70,72.

The two remaining higher order bits of the 9-bit address, A7–A8, are produced from the output of latch 68. These two bits represent the frequency select bits, $F_0$ and $F_1$. These two bits specify one of three address sections of the address space for the ROM 70,72. As previously discussed, contained in this address space are both digital magnitude code words for generating the three possible frequencies and reference clock generating data. If a 10 KHz frequency is to be produced, both $F_0$ and $F_1$ will be in a logic 0 state, thus selecting the lower ROM memory locations. Stored in this ROM memory address space is the generating data to produce the one-half of a cycle of the 10 KHz frequency. The next higher order address bit from the address counter 66, $Q_8$, is used to control one input of exclusive OR gates 76 to cause the digital magnitude code words produced on the output of the ROM to be complemented. In this manner, the second half cycle or negative half cycle for the 10 KHz frequency can be produced from the same magnitude values that were output from the ROM 70,72 to produce the first half cycle. However, this technique is not applied when the 20 KHz or the 40 KHz frequencies are selected.

In the address spaces of the ROM 70,72 for these two higher frequencies, specified by the logic states of $F_0$ and $F_1$, the magnitude values stored therein represent complete cycles of the sinusoidal waveform to be produced. However, for all three frequencies, the reference clock signal generating data is stored relative to the magnitude values in such a way as to produce the desired phase shift in the clock signal on lead 50 to compensate for the particular static phase shift errors in the coils and electronics of the tool at the respective frequency.

The Phase Shift Error Compensation Circuits

Referring again to FIG. 2, the circuits involved in the generation of the transmitter current $i_T$ and in the detection of the phase component signals in the receiver signal $V_r$ can introduce phase shift errors in the detected phase component voltages. Because the transmitter coil is not a perfect inductor, the phase angle between the transmitter current and the induced voltage in the formations differs from the ideal 90° phase relationship. This difference amounts to a phase shift error that is reflected in the measurements of the phase component signals if left uncorrected. Additionally, phase shift errors are introduced by the receiver coil 36 and the phase sensing means 43 involved in the detection of the phase component signals themselves. At some steady state temperature, the phase shift error between the current $i_T$ and either the "R" or "X" phase component signals of the receiver signal $V_r$ on lead 37 will be approximately constant. This constant phase shift error has been defined above as the static phase shift error. Modulating the amount of this phase shift error will be phase shifts introduced by such things as temperature variations in the passive and active component values of the electronics of the phase sensing means 43. These phase shift errors are dynamic in nature since the induction logging tool according to the present invention is operated in a borehole environment in which the temperature will vary with depth. These phase shift errors have been defined above as the dynamic or temperature dependent phase shift errors.

The logging tool according to the invention operates to automatically compensate for both the static phase shift errors and for the dynamically varying temperature dependent phase shift errors. Static phase shift errors are compensated for by phase shifting the reference clock signal on lead 50 relative to the sinusoidal transmitter signal on lead 28. Automatic compensation for the dynamic temperature dependent phase shift errors is achieved during an autophase cycle in which a test signal is derived from the transmitter coil current $i_T$ and is applied as the normal receiver signal to the phase sensing means 43. During each autophase cycle, the phase of the phase reference signal on lead 42 is selected to cause the phase sensing means 43 to detect the orthogonal phase component signal in the receiver signal 39 (the "X" component), which, in this case, is the test signal on lead 33. In other words, the phase reference signal on lead 42 during an autophase cycle is approximately 90° phase shifted relative to the test signal 33 derived from transformer 31.

The feedback error voltage AUTO$\phi$ on lead 45, indicative of the polarity of the detected phase component signal during the autophase cycle, is fed back to the autophase unit 32. The signal AUTO$\phi$ controls a circuit means contained within the autophase unit 32 to phase shift the phase reference signal on lead 42 in a direction to reduce or cause the magnitude of the detected phase component signal during each autophase cycle to approach zero. At the completion of each autophase cycle, the amount of phase shift applied to the phase reference signal on lead 42 is retained until the next autophase cycle. In this manner, the temperature dependent phase shift errors can be dynamically compensated for by periodically adjusting the phase of the phase reference signal on lead 42 relative to the transmitter coil 34 current $i_T$. Since the autophase unit 32 generates a single phase reference signal on lead 42 that switches between two phase relationships to the transmit current $i_T$, and because the phase relationship between the two phase states is always a precise 90°, it is only necessary to compensate for phase shift errors at either phase state. This is true because the precise 90° phase shift in the phase reference signal is always obtained regardless of how much the phase reference signal on lead 42 is phase shifted by the autophase unit 32.

Figure 4:
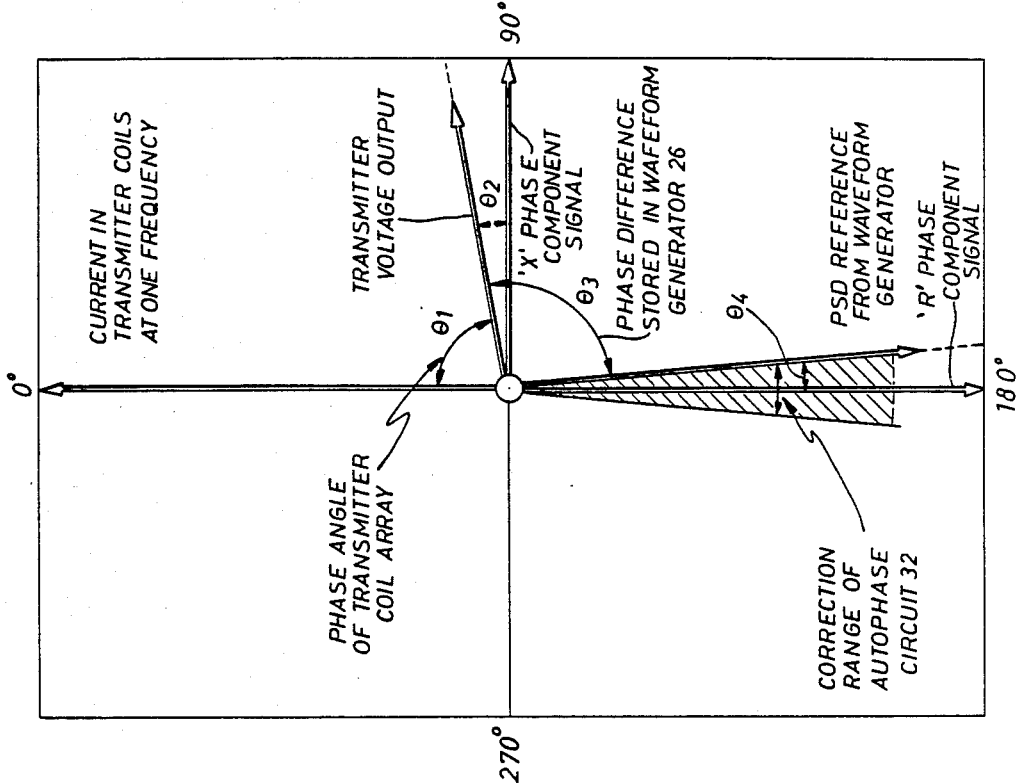
FIG. 4 is a phase diagram illustrating the phase relationships between the current in the transmitter coil system, the transmitter voltage output, and the R and X signals received in the receiver coil system.

FIG. 4 illustrates the phase angle relationship between vectors of the current in the transmitter coil 34, the transmitter voltage applied to the coil(s), and the phase quadrature component signals in the receiver signal $V_r$ on lead 37. The phase relationship illustrated in FIG. 4 represents a nominal operating condition for the induction tool of the present invention in an actual borehole environment. That is, the temperature for the tool is at the mid-point of the expected temperature range that the induction tool is expected to encounter. As previously discussed, the static phase shift errors are compensated for by phase shifting the reference clock signal on lead 50 relative to the current in the transmitter coil 34. This phase angle is illustrated in FIG. 4 as $\theta_3$.

Also illustrated in FIG. 4 is the correction range of the autophase unit 32 over which autophase unit 32 is able to phase shift the phase reference signal on lead 42 during each autophase cycle. The autophase unit 32 is able to phase shift the phase reference signal on lead 42, regardless of its phase state, within this correction range to compensate for the dynamic phase shift errors. Thus, the "R" phase component signal of the receiver signal 37 can be detected with a first phase reference signal on lead 42, and the "X" phase component signal can be subsequently detected with a second phase reference signal on lead 42 that is orthogonal (90°) to the first.

Figure 10:
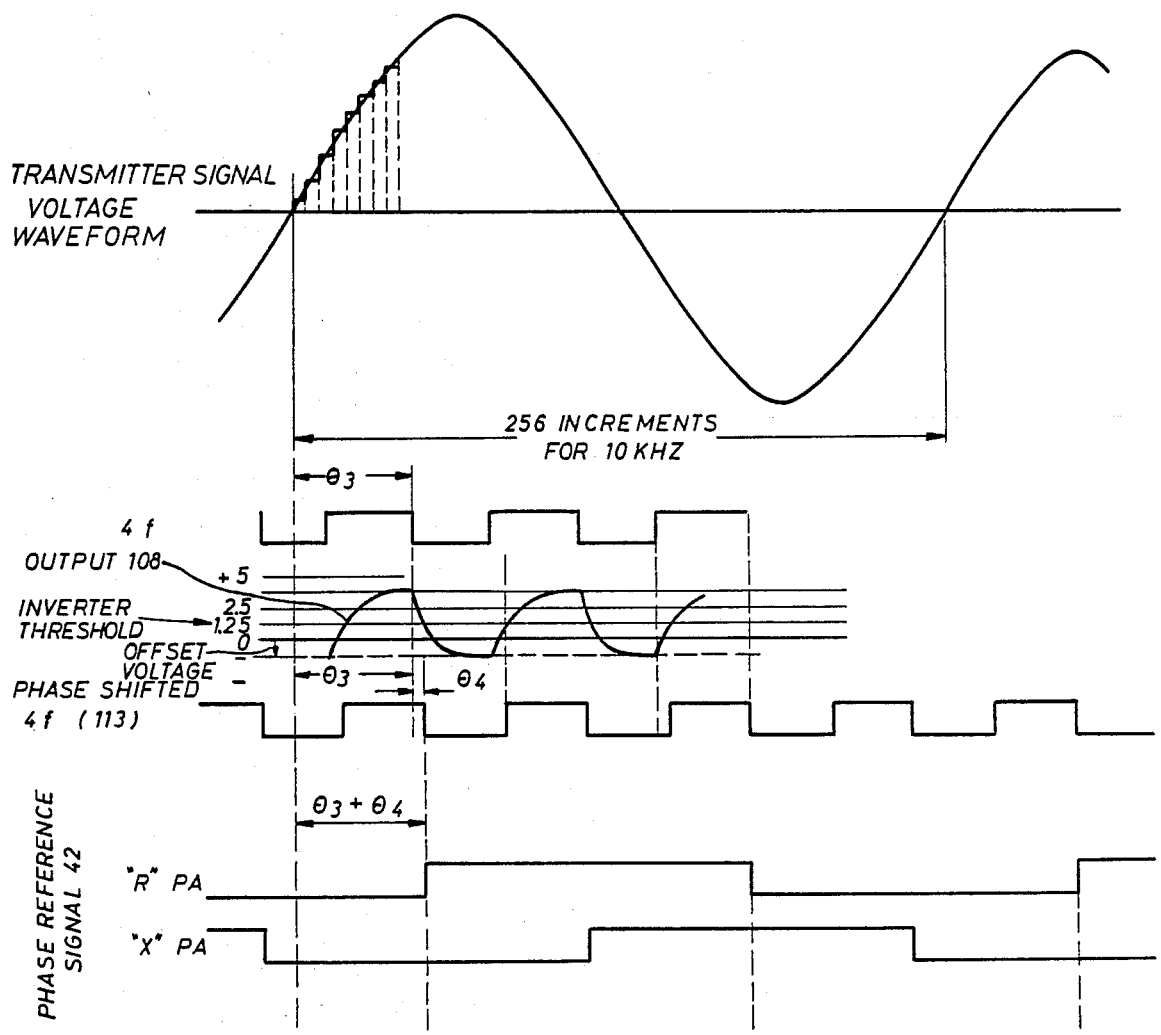
FIG. 10 is an illustration of the phase relationship between the transmitter signal voltage waveform and the phase reference signal applied to the phase sensitive detector for detecting both the R and the X phase component signals in the receiver signal.

The phase difference stored in waveform generator 26 is further illustrated as a function of time in FIG. 10. FIG. 10 shows a timing diagram for the reference clock signal on lead 50 and the phase reference signal on lead 42 drawn relative to the transmitter signal voltage waveform that is applied across the transmitter coil 34. For the presently preferred embodiment, one cycle of the 10 KHz transmit signal frequency is generated in 256 increments (this of course depends upon the frequency selected, i.e., 128 for 20 KHz, 64 for 40 KHz).

Referring now to FIG. 10, the reference clock signal on lead 50 that is outputted by the digital waveform generator 26 is shown phase shifted by an angle of $\theta_3$. The phase reference signal on lead 42 is shown for both the R and X phase relationships with the transmitter signal. Both the R and X phase relationship waveforms for the phase reference signal are shown drawn as two separate signals, but in fact, there is only one phase reference signal 42 having one or the other phase relationship illustrated depending on which of the quadrature phase components is to be detected in the phase sensing means 43. FIG. 10 further illustrates that for the phase reference signal, the total amount of phase shift is equal to the sum of the phase angles $\theta_3 + \theta_4$ (see also FIG. 4). The phase angle $\theta_4$ is that phase shift introduced in the phase reference signal on lead 42 by the autophase unit 32 while compensating for the dynamic phase shift errors.

The Autophase Unit 32

Figure 11:
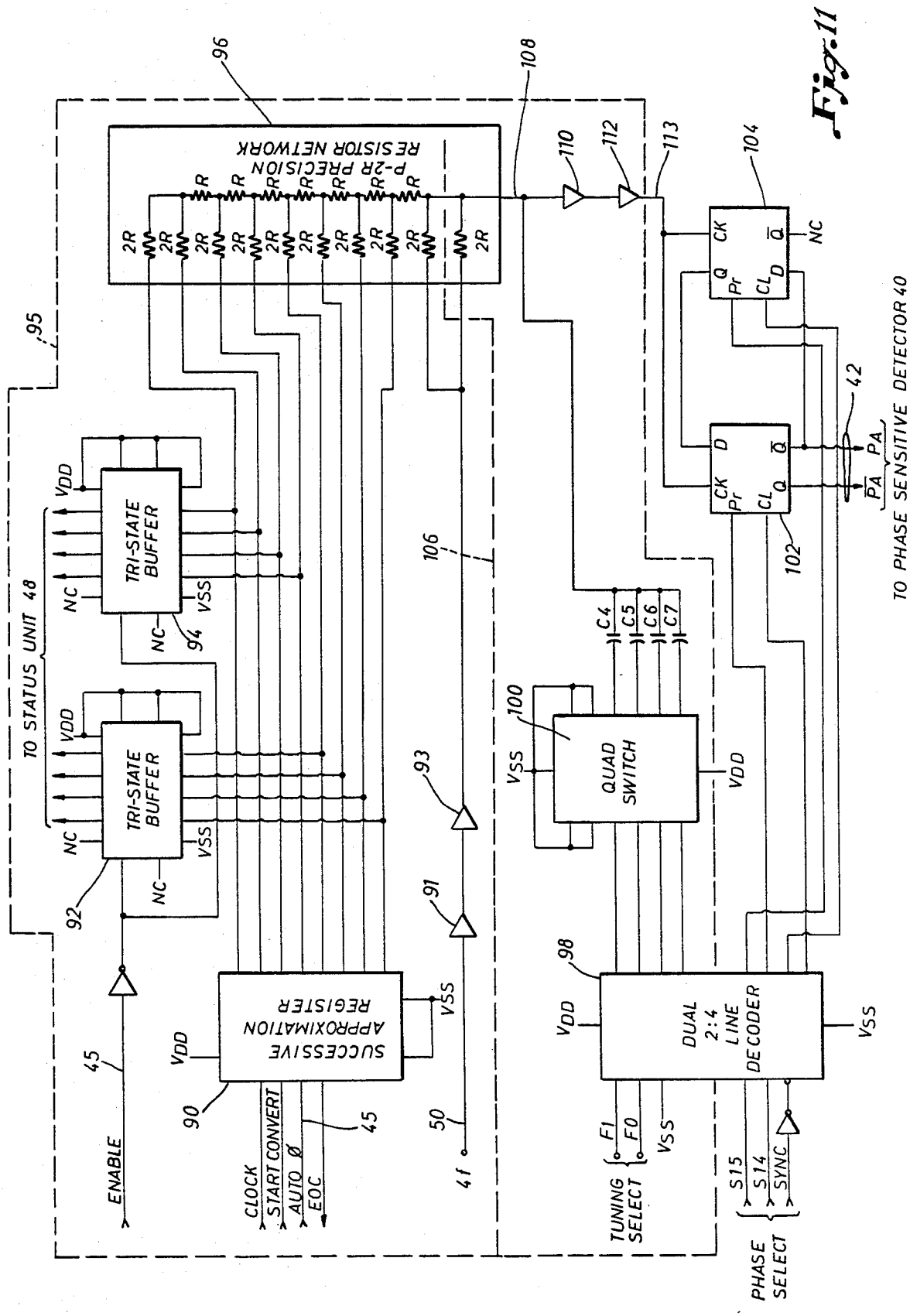
FIG. 11 is a more detailed circuit diagram of the autophase unit included in FIG. 2.

Referring now to FIG. 11, a detailed circuit diagram of the autophase unit 32, the reference clock signal on lead 50 is shown applied to an R-2R precision resistor network 96. Responsive to a successive approximation register clock (SAR CLOCK) generated by the waveform generator 26 is a successive approximation register 90. The output from this register is also applied to the precision resistor network 96 so that the voltage which appears on output line 108 of resistor network 96 has a DC average value determined by the current digital content of the successive approximation register 90. In this manner, the average value of a filtered reference clock signal can be affected by controlling the digital count in the successive approximation register 90.

Connectable from the output of the resistor network 96 to ground is a parallel combination of capacitors C4–C7, which are selectively connected to ground through quad switch 100 in response to the frequency select control bits $F_0$ and $F_1$ inputted to the dual 2:4 line decoder 98. Decoder 98, switch 100 and capacitors C4–C7 comprise phase control means 106 for controlling the phase shift applied to the filtered referred clock signal according to the magnitude of the contents of register 90.

The presence of a capacitor on the output of the resistor network 96 functions as a low pass filter to filter or smooth the digital square wave reference clock signal on lead 50 whose average value is being modulated by the value contained in the successive approximation register 90. This voltage waveform 108 is illustrated in FIG. 10 showing the smoothing effect of the filter capacitor connected to the output of the resistor network 96. Inverters 110 and 112, serially connected to the output of the resistor network 96 function to convert the filtered and DC shifted reference clock signal into a square wave suitable for digital circuits. A property of an inverter gate, such as inverter 110, is that the input DC voltage must exceed a threshold level before the output changes state. Thus, by smoothing the reference signal, controlling its DC average value and taking advantage of the threshold property of an inverter gate, it is possible to affect a small amount of phase shift to the reference signal as it appears on the output of inverters 110 and 112. A phase shifted reference clock signal is illustrated in FIG. 10 as having been phase shifted in the amount of the phase angle $\theta_4$.

Responding to the phase shifted reference clock signal on lead 113 are first and second flip-flops 102 and 104, respectively. These two flip-flops are interconnected such that the output of flip-flop 102 generates the phase reference signal on lead 42 which has either the "R" phase relationship or the "X" phase relationship to the transmitter coil current $i_T$ depending upon the phase select bits that are applied to the decoder 98. These phase select bits are used to control the "preset" and "clear" inputs to the flip-flops.

By controlling the starting logic states of flip-flops 102 and 104 via the preset and clear inputs, a square wave signal is generated on the output of flip-flop 102 that shift in phase by a precise 90° between the two phase relationships with respect to the transmitter current $i_T$. This precise 90° phase changing relationship enables the phase quadrature component signals, "R" and "X", to be accurately detected by a single phase sensitive detector 40. Depending upon which of the transmitter frequencies are selected, the quad switch 100 will selectively connect to the output of the resistor network 96 the proper roll-off capacitance (C4–C7) to ground.

The Autocalibration Circuits

A common problem in signal processing circuits of the type adapted to the borehole environment is a non-linearity of the transfer function including non-linearities due to such things as temperature drift of the components in the circuits. Also, the gain of devices may vary significantly with signal level, and this problem is more apparent in induction logging where signal levels vary over a wide range, for example, several decades of magnitude. A single-point calibration may be entirely inadequate to characterize the system gain at a substantially different signal level. In particular, a system whose final result is calculated as a small difference between two relatively large measured signals shows a particular sensitivity to small errors present as a result of inaccurate calibration.

To substantially reduce this problem, the present invention includes calibration circuits that may be switched into the measurement channel at regular times intervals following a pre-programmed pattern. A sample of the transmitter output is taken and used to develop calibration signals. FIG. 2 contains an illustration of the autocalibration circuits according to the preferred embodiment of the invention to derive calibration signals at the output tap points a, b, c and d of transformer 29. Transformer 29 is designed to provide multiple signals at levels sufficient to substantially cover the expected range of formation response signals. Controller 22 switches the measurement channel sequentially between one of the calibration signals and the normal receiver signals $V_r$. During the autophase cycle previously discussed, controllable switch S2 is selecting tap a as the test signal to be used. During an autocalibration cycle, anyone of the calibration taps may be used. Any changes in the output of the transmitter or measurement channel caused by temperature variations or other effects, will cause proportionate changes in both the calibration and received signals, so that a compensation of this drift is possible.

A linearization formula can be obtained which takes the ratio of the two signals and determines the characteristics of the formation relative to the fixed values of the calibration circuitry. A mathematical procedure is used in CPU 10 to enable it to calculate the formula based on the results of the calibration measurements representing the corrections to be applied to subsequent formation signal data. This mathematical procedure in essence is a fitting of the calibration test signal response to a known mathematical function. This mathematical function represents the calculated transfer function for the tool as obtained from models of the circuit design of the tool using conventional circuit analysis techniques. In effect, the test calibration points are used to recalculate the numerical constants in the transfer function.

These numerical constants used in the formula are periodically recomputed at intervals of time determined by the anticipated magnitude of temperature drift. The result of this process is shown in FIG. 13, where the transfer function of the tool is shown as a graph of output signals ($S_o$) against input signals ($S_i$). Four calibration points ($X_1$–$X_4$) are shown, producing four outputs ($Y_1$–$Y_4$). These outputs are used to compute a correction formula based on the knowledge of the amplitudes of $X_1$–$X_4$. Subsequent formation data ($S_o$) applied by the computer to this formula will be substantially corrected to produce the apparent signal ($S_i$) in close conformity with $S_i$. An analysis of the physical causes of non-linearity in the measurement channel of the tool allows the derivation of an equation that models the actual transfer function. It is then possible to invert the equation to produce the correction formula. An alternative method, the use of a least mean squares fit of the formula, may also be used.

The multiple calibration points $X_1$–$X_n$ must satisfy two requirements; a precise ratio between each signal, and a constant absolute level of the ensemble. In the present invention (see FIG. 2), a precision resistor R defines the constant absolute magnitude with transformer 29 having multiple-ratio windings to supply the various temperature-stable calibration signals. Thus, the requirement for high temperature-stability is transferred from the measurement channel circuits to the calibration circuits.

Noise signals may be unavoidably added to the formation signal either in the formation or in the circuits of the tool. In both cases, the time spent by the system during calibration represents a loss of time available to improve the signal-to-noise ratio by averaging (for example, using CPU 10). Noise added in the tool introduces the extra burden of a reduction in calibration signal-to-noise ratio. The final computed result $S_i$ is a combination of formation and calibration signals, including their respective noise contributions. Since the two types of signals are measured sequentially, there will be no correlation between the noise components caused by random processes (for example, Johnson noise). An optimum solution must therefore be found for the relative times spent by the tool in measuring the two signals to maximize the final signal-to-noise ratio.

To simplify the calculations, consider the case of a single calibration point. This is an acceptable approximation if the amount of non-linearity in the system (and associated correction) is small. For a single calibration point, the following obtains:

$$\text{total formation signal} = S_i + \frac{(N_i + N_R)}{T_m} \tag{1}$$

$$\text{total calibration signal} = S_c + N_R/T_c \tag{2}$$

where
  $S_c$ = calibration signal
  $S_i$ = formation signal
  $N_i$ = formation noise/unit bandwidth $N_R$ = receiver noise/unit bandwidth
$T_c$ = calibration time
$T_m$ = measurement time,
all referred, for example, to the receiver input.

The maximum time allowed to accurately measure $S_c$ is determined by the relatively slow drift of this parameter with changes in temperature, and for optimum S/N ratio the bandwidth should be no larger than this value in the case of "white" noise with constant power per unit bandwidth. $S_i$ must be measured with a bandwidth sufficient to resolve the changing details of the rock formation as the logging tool traverses the borehole. This will depend on the spatial resolution of the transducer array and the speed at which the tool is moved. In both cases, the bandwidths may be adjusted by the use of computer averaging of successive measurements. Where the logging speed is changed to suit differing operational requirements, the computer is programmed to adapt the bandwidth automatically to optimize S/N ratio by averaging samples as a function of distance along the borehole. When implemented, such a system also allows the S/N ratio to be varied at will, by changing the logging speed.

The final computation of the formation parameter (P) is done by taking the ratio of the total formation signal to the total calibration signal. Since the noise sources are additive, we may use the method of partial derivatives to combine the separate signal/noise ratios:

$$\text{Total signal/noise ratio } P/N = \frac{1}{\frac{(N_i + N_R)}{S_i T_m} + \frac{N_R}{S_c T_c}} \quad (3)$$

Let the total time available for a complete cycle of measurement and calibration be, $$T = T_m + T_c, \quad (4)$$

then, $$P/N = \frac{T}{\frac{(N_i + N_R)}{S_i} \cdot \frac{T}{T_m} + \frac{N_R}{S_c(1 - T_m/T)}} \quad (5)$$

This function has a well defined maximum point which occurs at a measurement time fraction.

$$T_m/T = \frac{a - \sqrt{a}}{a - 1}, \text{ where} \quad (6)$$

$$a = \frac{(N_i + N_R) S_c}{N_R S_i} \quad (7)$$

This analysis may be used to optimize the program of sequential measurements in the logging tool. However, as already discussed, the final integration times ($T_m$ and $T_c$) may be adjusted further by the computer to adapt to particular situations.

The most efficient method of improving signal/noise ratio is for the tool to integrate the signal during successive time intervals devoted to each of the sequential measurements. Floating point analog-to-digital converter 46 performs this function. The process is simplified if the successive intervals are of identical length, but this may conflict with the optimum formation/calibration time ratio calculated from equations (6) and (7).

A solution of the problem may be found by considering the pattern of the samples. For example, where ($T_m/T$) optimum is approximately 0.75 or ¼, then we may make three formation measurements for every calibration, i.e., calibration (tap "a"), formation, formation, formation, calibration (tap "b"), formation, etc. This pattern is stored in the controller 22, and may be modified to suit actual operating conditions or changes in the performance of the tool.

The Floating Point Analog-to-Digital Converter 46

Figure 12:
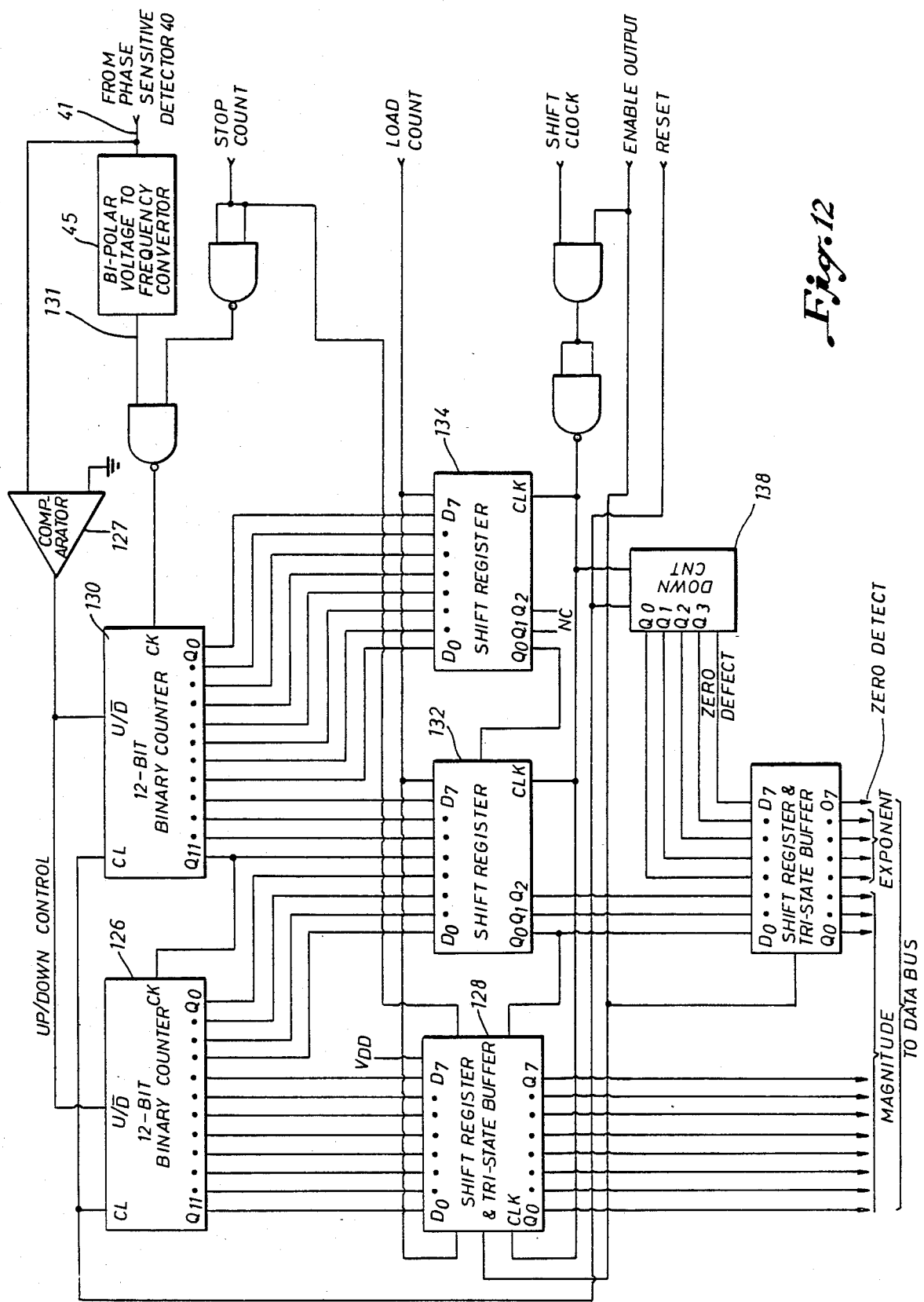
FIG. 12 is a more detailed circuit diagram of the floating point analog-to-digital converter shown in FIG. 2.

Turning now to FIG. 12, a detailed circuit diagram of a bipolar floating point analog-to-digital converter is shown. The converter shown in FIG. 12 may also operate as a unipolar converter, and the following description refers to such operation. The output from the phase sensitive detector 40 is applied to a voltage-to-frequency converter 45 which produces a digital clocking frequency signal 131 proportional to the magnitude of the input analog voltage on lead 41. The basic principle of the converter of the present invention is to integrate the detected component signal on lead 41 over a predetermined time interval $T_i$ by accumulating the clock cycles from the voltage-to-frequency converter 45 in two serially connected asynchronous 12-bit binary counters 126 and 130. At the completion of each converter time interval $T_i$, the contents of counter 126,130 are transferred to a shift register consisting of serially connected shift register units 128, 132 and 134.

Characteristic of digital induction logging tools is the very wide dynamic range in signals that are generated on the output of phase sensitive detectors, such as the phase sensitive detector 40, as a function of the conductivity of the formations being logged. In order to function properly over this wide dynamic range, a large number of binary counter stages are required to accumulate the clock cycles from the voltage-to-frequency converter 45 during each $T_i$ interval. Even though a large number of clock cycles may be created, it is not necessary that the full contents of the two binary counters 126, 130 be transmitted to the surface. Rather, data compression is used whereby the binary number contained in counters 126 and 130 at the end of each conversion interval are converted to a floating point number having a digital code for the magnitude and and a digital code for the exponent. The total number of digits for both the magnitude and the exponent is less than the total number of bits in counters 126 and 130. In this manner, the digital samples obtained by the induction tool of the present invention are ready for floating point calculation by the CPU 10 after transmission to the surface, and a significant reduction in the amount of data reported uphole is achieved.

In order to convert the accumulated conversion count in counter 126,130, the shift register 128,132,134 is loaded with the contents of the binary counter 126,130 at the end of each conversion interval and shifted in a direction to cause the most significant bit (MSB) of a digital word formed from a sub-set number of output bits of the shift register 128,132,134 to contain a logic 1 (a logic 1 or logic 0 depending upon the sign of the digital sample if bipolar operation is used). This sub-set of output bits is less than the total number of bits contained in the binary counter 126,130, and represents the magnitude of the floating point number thus obtained. As illustrated in FIG. 12, the output of the twelve most significant bits of the binary counter 126,130 are presented as the magnitude of the floating point number. A down counter 138 responds to the shift clock pulses that are shifting the shift register 128,130,134 so that for each shift pulse, down counter 138 decrements its count by one count. The 4-bit down counter 138 comprises the 4-bit exponent of the floating point conversion value. At the start of each floating point conversion, the contents of down counter 138 is preset to an all 1's pattern.

The shifting of the contents contained in shift register 128,132,134 is continually shifted to the left until one of two events occurs, either a logic 1 appears in the most significant bit of the magnitude code word for the floating point value or the count in down counter 138 reaches zero. Upon the occurrence of either of these events, shifting of shift register 128,132,134 ceases, and both the magnitude and the exponent values are transmitted as the floating point conversion sample from A/D converter 46. In a further implementation, the most significant bit (MSB) containing a logic 1 or logic 0 as previously described is eliminated by shifting the data one additional time, and means are provided in subsequent decoding to restore the missing bit, allowing an increase in the accuracy of the floating point sample.

The length of the conversion cycle time $T_i$ and the constant of proportionality for the voltage-to-frequency converter 45 determines the conversion constant for converting the digital magnitude and exponent floating point values to an amplitude value for the detected phase component signal on lead 41. For unipolar operation, voltage-to-frequency converter 45 has a conversion coefficient of between 200 and 500 KHz/volt and a dynamic range of 1 millivolt to 10 volts (80 db) at all temperatures from −65° C. to 200° C.

Each of the circuits shown and described herein are intended to operate in extreme temperature environments encountered in induction well logging. Temperatures in excess of 200° C. are not uncommon. Accordingly, where such temperatures are to be encountered, attention must be given to circuit component selection, layout and design in order to insure that the circuits will continue to perform their functions as disclosed and discussed herein.

In FIG. 6 is illustrated a timing diagram for various of the signals present in the bipolar A/D converter circuit shown in FIG. 12. The operation of converter 46 when operating in a bipolar mode is essentially the same as described above with reference to operation in a unipolar mode except that counter 126 and 130 are disposed to count up or down depending on the polarity of the input. In bipolar operation, the input voltage 41 from the phase sensitive detector 40 will have voltage excursions both positive and negative. In unipolar operation, the voltage excursions are all positive. FIG. 6 illustrates a possible bipolar voltage signal for the signal on lead 41. To operate as a bipolar A/D converter, the voltage-to-frequency converter 45 described above must operate to produce an output frequency signal whose frequency is dependent upon the absolute value of the magnitude of its input signal. That is, produce the same frequency for a given positive voltage as it does for a negative voltage of the same magnitude.

To distinguish between positive and negative input voltage, a comparator 127 responds to the signal on lead 41 to produce a counting control signal, UP/DOWN CONTROL, to up/down counters 126 and 130. As shown in FIG. 6, when the signal on lead 41 is positive, counter 126 and 130 count up, and when negative, the counters count down. In this manner, the count in counter 126 and 130 at the end of each counting period $T_i$ contains the average value of input signal 41 over one time period, and the most significant bit in the last counter of the chain in counters 126 and 130 represents the polarity of the average value.

At the completion of each counting interval $T_i$, RESET clears counter 126 and 130, and the next counting interval is begun. At the same time, down counter 138 is set to the all 1's pattern so that the count for the just completed counting interval, which is now contained in shift registers 128, 132, 134, can be converted to a floating point sample as previously described. In other words, as each counting interval is begun, the previous integrated sample obtained by converter 46 is converted to a floating point sample and made available for transmission to the surface.

Summary of Operation

In normal operation, the digital induction logging tool 1 of the present invention responds to command and data signals transmitted from a surface located central processing unit 10 to select a transmitter frequency from among a plurality of transmitter frequencies or a choice of multiple simultaneous frequencies. The frequency or frequencies selected may be based on such things as the actual conductivity of the formation being measured in order to automatically obtain the most accurate reading of conductivity possible. A digital waveform generator 26 responds to the frequency select signals to digitally generate a low distortion, highly phase stable sinusoidal transmitter frequency signal or a waveform consisting of two or more superimposed sinusoidal signals. This transmitter signal is applied to a transmitter coil 34. Using the principle of superposition we may consider the different frequencies of a composite waveform as described above as if they were separate. The following discussion will consider the case of a sinusoidal transmitter output.

Responsive to the magnetic field generated in the earth's formations by the current flowing in this transmitter coil, formation eddy currents are caused to flow. These flowing eddy currents themselves produce magnetic fields which are sensed by a receiver coil 36 to produce a receive signal $V_r$ on lead 37. A single phase sensitive detector 40 is employed to sequentially detect, at each measurement point of the borehole the phase quadrature components, "R" and "X", contained in the receiver signal to obtain signals that are representative of the conductivity of the formations.

Although the R and X components are sequentially measured in a single phase sensitive detector by the present invention, the rate at which these measurements are sequentially taken is high enough that both the R and X measurements for a given depth point are the same as those that would have been obtained had the tool been stationary while the R and X measurements were made. In other words, the present invention obtains essentially correlated R and X readings for each depth point even though the measurements are sequentially made. In order to achieve precise and accurate measurements of these phase quadrature component signals, the present invention compensates for phase shift errors resulting from components of the circuits in the induction tool itself. These phase shift errors are characterized in two classifications, static and dynamic or temperature dependent varying phase shift errors.

The digital waveform generator 26 also produces a reference clock signal on lead 50 having a predetermined phase relationship to the resulting sinusoidal transmitter signal on lead 28, which the waveform generator also produces. Responsive to the reference clock signal, an autophase unit 32 generates a phase reference signal on lead 42 to a phase sensitive detector 40. The phase shift between the reference clock and the transmitter signal compensates for the static phase shift errors. To compensate for the temperature dependent phase shift errors, an autophase cycle is periodically initiated during a normal logging run. During this autophase cycle, a predetermined test signal derived from the transmitter current $i_T$ is to the detector 40, rather than the normal receiver signal $V_r$ from the receiver coil 36. Additionally, the phase relationship of the phase reference signal on lead 42 is selected to detect the "X" phase component signal.

The polarity of the resulting output of the phase sensitive detector 40 is detected and applied as a feedback error signal to the autophase unit 32. This feedback signal controls the autophase unit 32 to phase shift the phase reference signal on lead 42 in a direction to reduce the output of the phase sensitive detector 40 to zero. Because there should be zero "X" component signal in the test signal derived from the transmitter current $i_T$, it follows that by phase shifting the phase reference signal in a direction to insure that the detected phase component signal is actually zero automatically and dynamically compensates for any temperature dependent phase shift errors present in all the measurement of either the R or the X phase component signals.

During the normal logging run, the R and X phase component signals sequentially detected by the single phase sensitive detector 40 are converted to floating point digital samples by a wide dynamic range floating point converter 46. Thus, the present invention is able to obtain very precise and accurate digital measurements of the R and the X component signals in the receiver signal $V_r$ downhole where the signal-to-noise ratio is at its maximum before being transmitted to the surface CPU 10 for further processing.

During the sequential measurement of components in the receiver signal, the tool produces a sequence of predetermined calibration signal derived from the transmitter current $i_T$ which are applied to the phase sensitive detector 40 in place of the normally applied receiver signal $V_r$. From the measurements thus obtained for the calibration signals, the surface located CPU 10 is able to produce a correction formula for correcting the signal measurements to eliminate the non-linearities in the transfer functions of the tool itself. These non-linearities result from such things as non-linearities in gain over wide signal ranges and in temperature drift in the circuit components.

In describing the invention, reference has been made to a preferred embodiment. However, those skilled in the art and familiar with the disclosure of the invention may recognize additions, deletions, substitutions or other modifications, which would fall within the purview of the invention as defined in the appended claims.

I claim:

1. An induction logging tool adapted for operation in a borehole in association with surface equipment, for measuring a characteristic of sub-surface formations, the tool including a transmitter coil which induces formation currents to flow in response to a transmitter signal and a receiver coil which generates a signal characteristic of the formation in response to these currents, the tool comprising:

a waveform generator for digitally generating a sinusoidal transmitter signal and a reference clock signal, said generator including:

a digital memory having a plurality of address sections, said address sections having stored therein magnitude values of sinusoidal waveforms of a respective plurality of different predetermined frequencies, said memory having further stored therein reference clock signal generating data, said data being stored in memory address locations selected relative to said magnitude values in such manner that the reference clock signal generated from said data is phase shifted a predetermined amount with respect to the transmitter signal of the respective frequency, said memory having a frequency select address portion the content of which specifies a particular address section, latch means providing the content of said frequency select address portion in response to commands received from the surface equipment, a phase shift unit responsive to said reference clock signal for generating a reference phase signal, and a phase sensitive detector responsive to said reference phase signal and said characteristic signal from the receiver coil for generating an output signal indicative of the magnitude of a component of the characteristic signal that is in-phase with the reference phase signal.

* * * * *